United States Patent
Tandai et al.

(10) Patent No.: US 9,288,769 B2
(45) Date of Patent: Mar. 15, 2016

(54) WIRELESS POWER CONTROL APPARATUS AND METHOD HAVING MULTIPLE TRANSMIT POWER LEVELS

(71) Applicant: KABUSHIKI KAISHA TOSHIBA, Minato-ku, Tokyo (JP)

(72) Inventors: Tomoya Tandai, Tokyo (JP); Hidenori Okuni, Yokohama (JP); Koichiro Ban, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 138 days.

(21) Appl. No.: 14/021,787

(22) Filed: Sep. 9, 2013

(65) Prior Publication Data

US 2014/0079050 A1     Mar. 20, 2014

(30) Foreign Application Priority Data

Sep. 14, 2012  (JP) ................................ 2012-203174

(51) Int. Cl.
*H04W 52/30* (2009.01)
*H04W 52/48* (2009.01)
*H04W 52/22* (2009.01)
*H04W 52/36* (2009.01)

(52) U.S. Cl.
CPC .............. *H04W 52/30* (2013.01); *H04W 52/48* (2013.01); *H04W 52/228* (2013.01); *H04W 52/36* (2013.01)

(58) Field of Classification Search
CPC ............. H04B 7/18543; H04W 52/02; H04W 52/0203; H04W 52/0209; H04W 52/04; H04W 52/06; H04W 52/18; H04W 52/30; H04W 52/38
See application file for complete search history.

(56) References Cited

U.S. PATENT DOCUMENTS

| 5,450,616 | A * | 9/1995 | Rom ............................... 455/69 |
| 7,809,394 | B1 * | 10/2010 | Li et al. ......................... 455/522 |
| 2007/0280148 | A1* | 12/2007 | Ding et al. ..................... 370/318 |
| 2009/0311961 | A1* | 12/2009 | Banerjea ...................... 455/41.2 |
| 2011/0261707 | A1* | 10/2011 | Chin et al. ..................... 370/252 |
| 2012/0163181 | A1* | 6/2012 | Xue et al. ...................... 370/241 |
| 2013/0094491 | A1* | 4/2013 | Sun et al. ...................... 370/345 |

FOREIGN PATENT DOCUMENTS

JP        2006-033601 A       2/2006

* cited by examiner

*Primary Examiner* — Pao Sinkantarakorn
*Assistant Examiner* — Stephen Steiner
(74) *Attorney, Agent, or Firm* — Holtz, Holtz & Volek PC

(57) ABSTRACT

According to one embodiment, a wireless communication apparatus includes a generation unit, a control unit, a transmission unit, a reception unit and an analysis unit. The control unit sets, as a first value, a magnitude of a transmission power of the first frame, and sets, as a second value smaller than the first value, a magnitude of a transmission power of the second frame. The transmission unit transmits the first frame at a first time interval until an acknowledgement frame is received, and transmits the second frame at a second time interval until an accept frame is received. The analysis unit analyzes the request transmission power information. The control unit determines a transmission power of a data frame based on the request transmission power information.

7 Claims, 32 Drawing Sheets

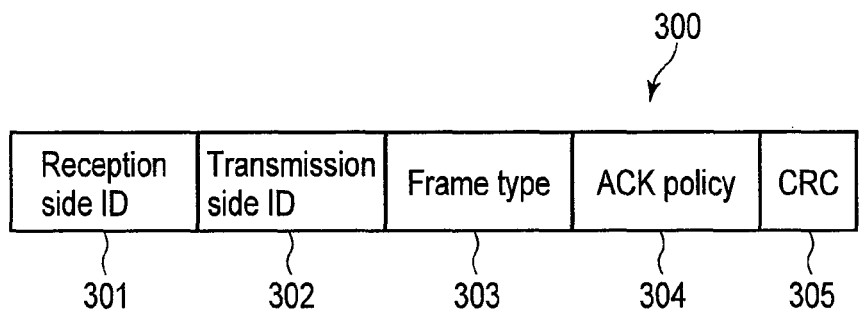
F I G. 3
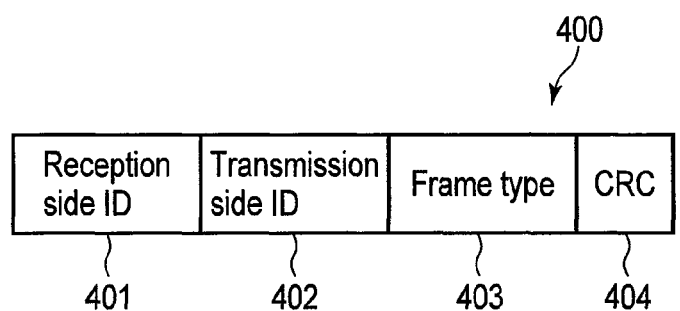
F I G. 4
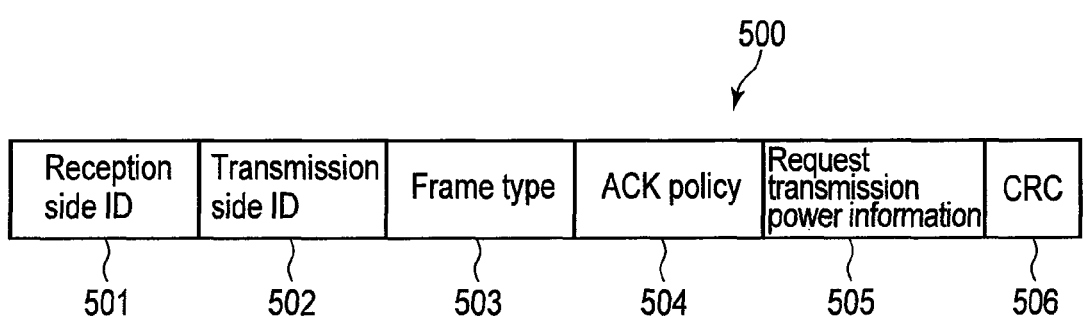
F I G. 5

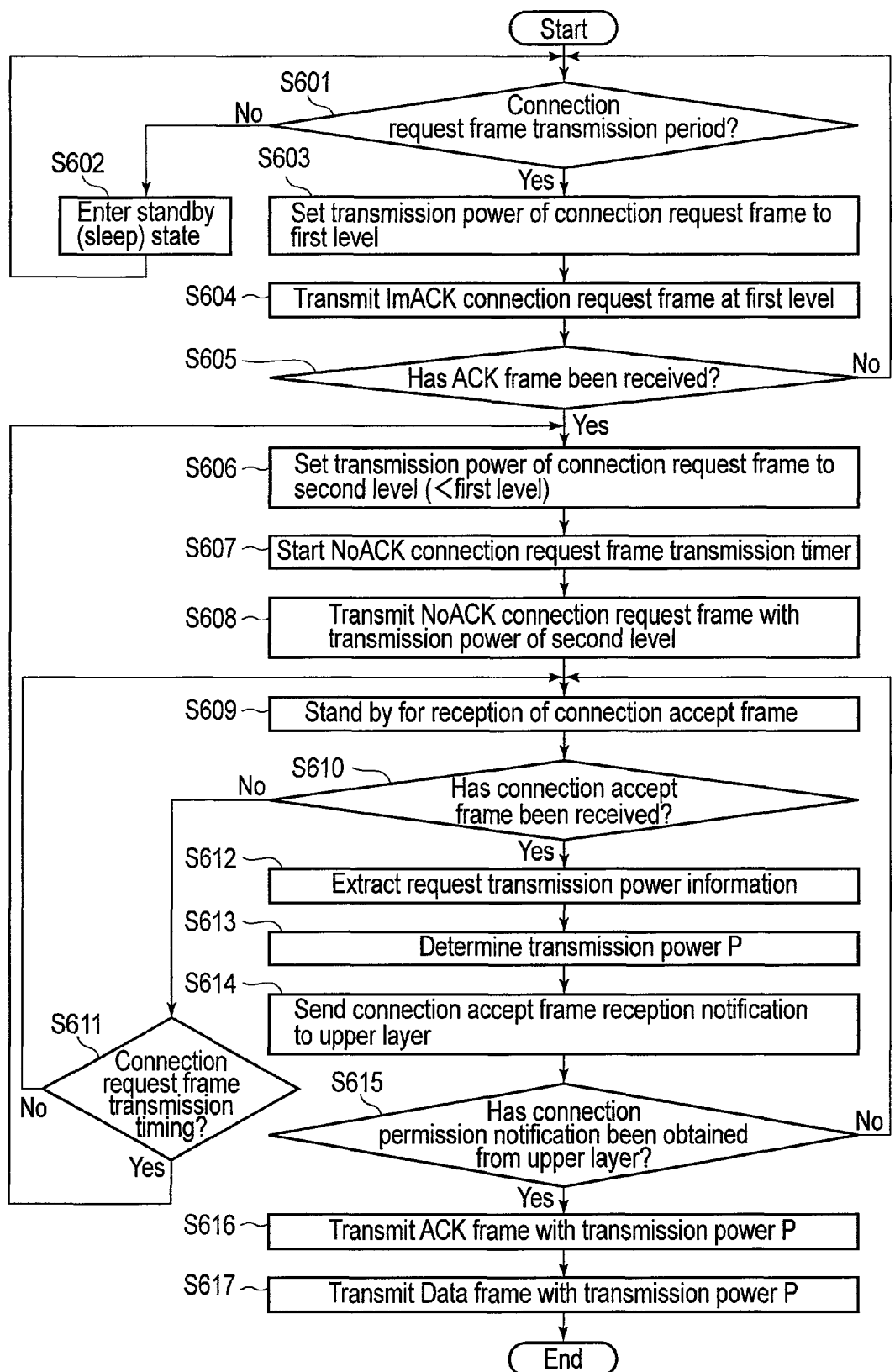
F I G. 6

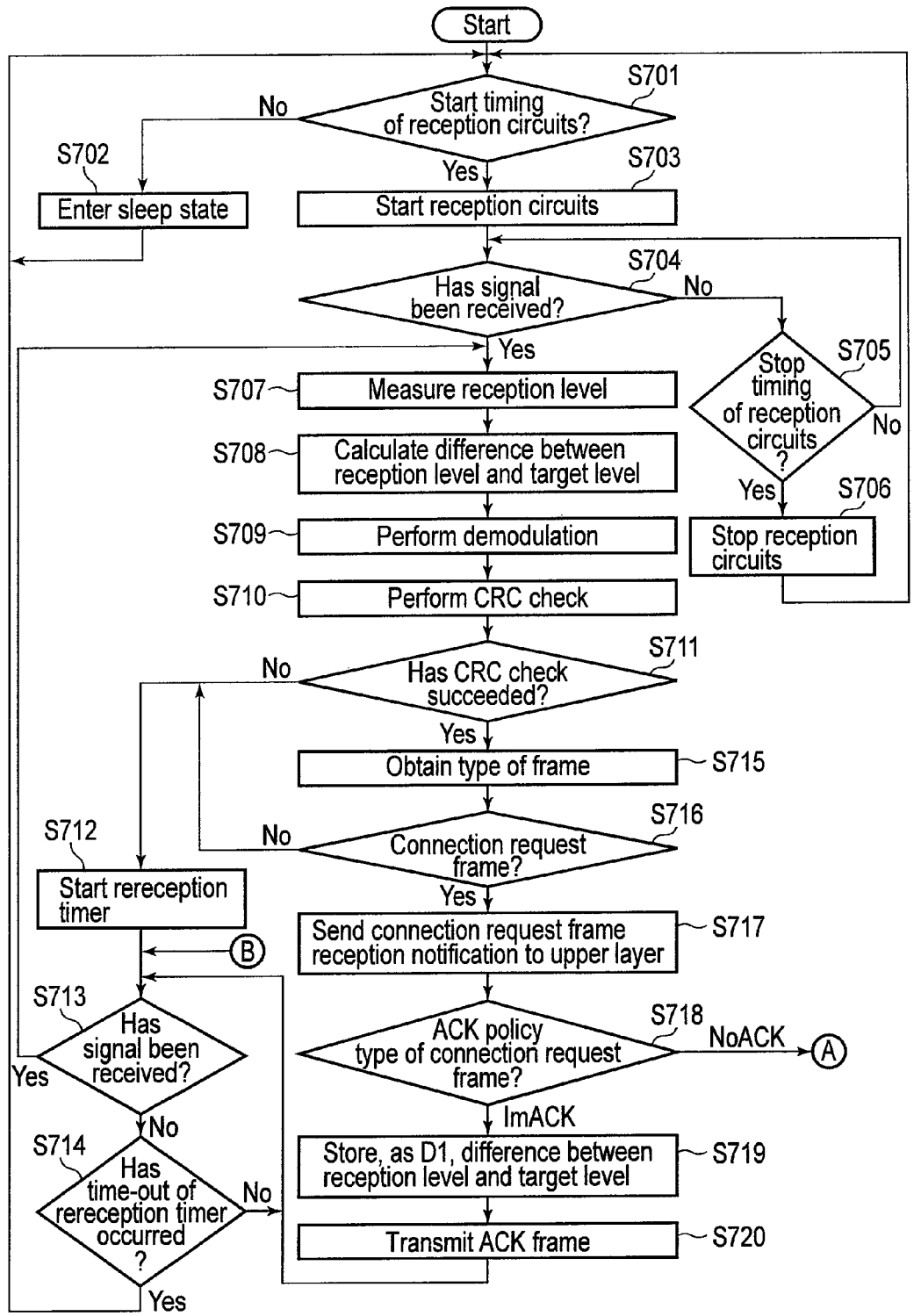
F I G. 7 A

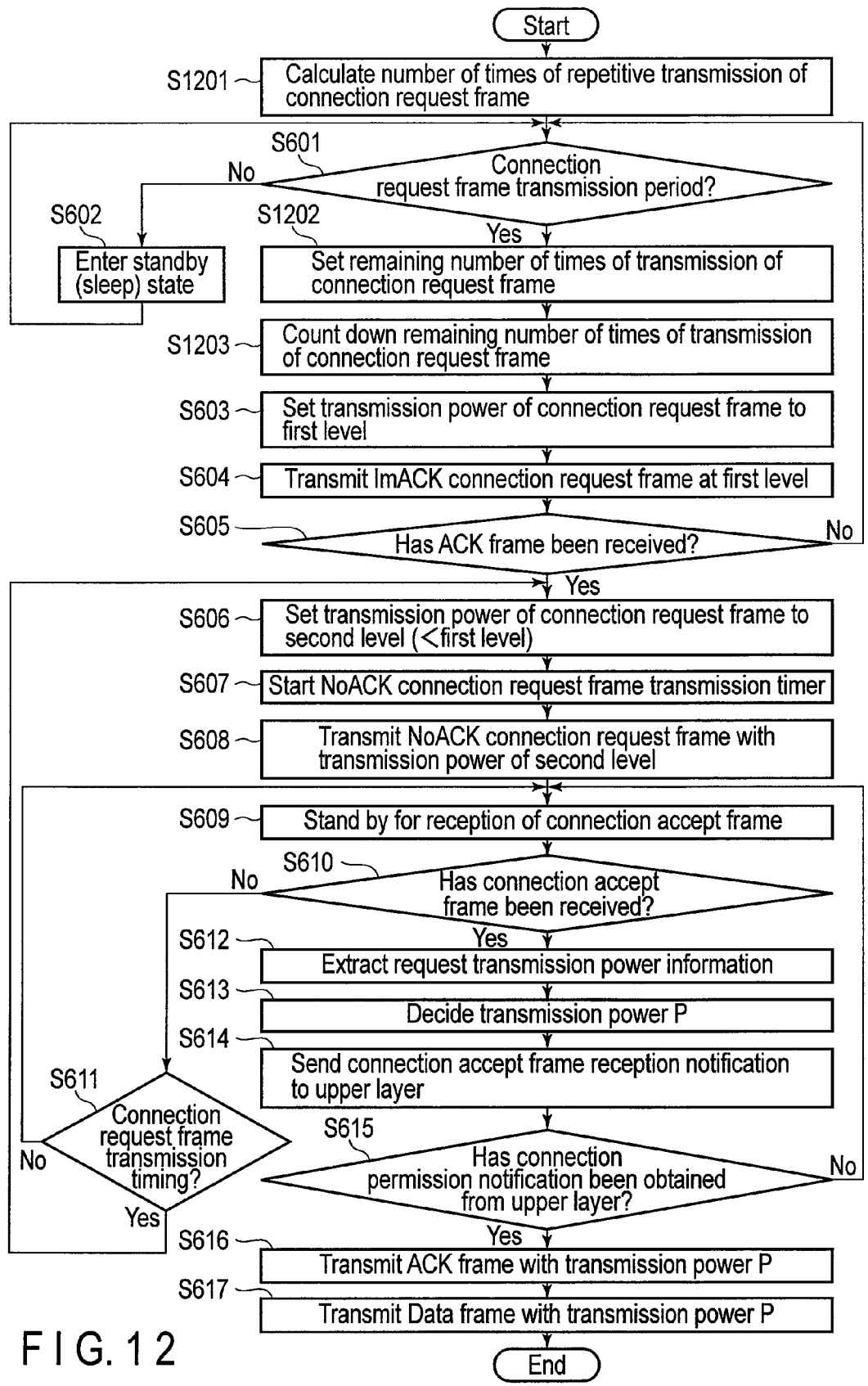
F I G. 12

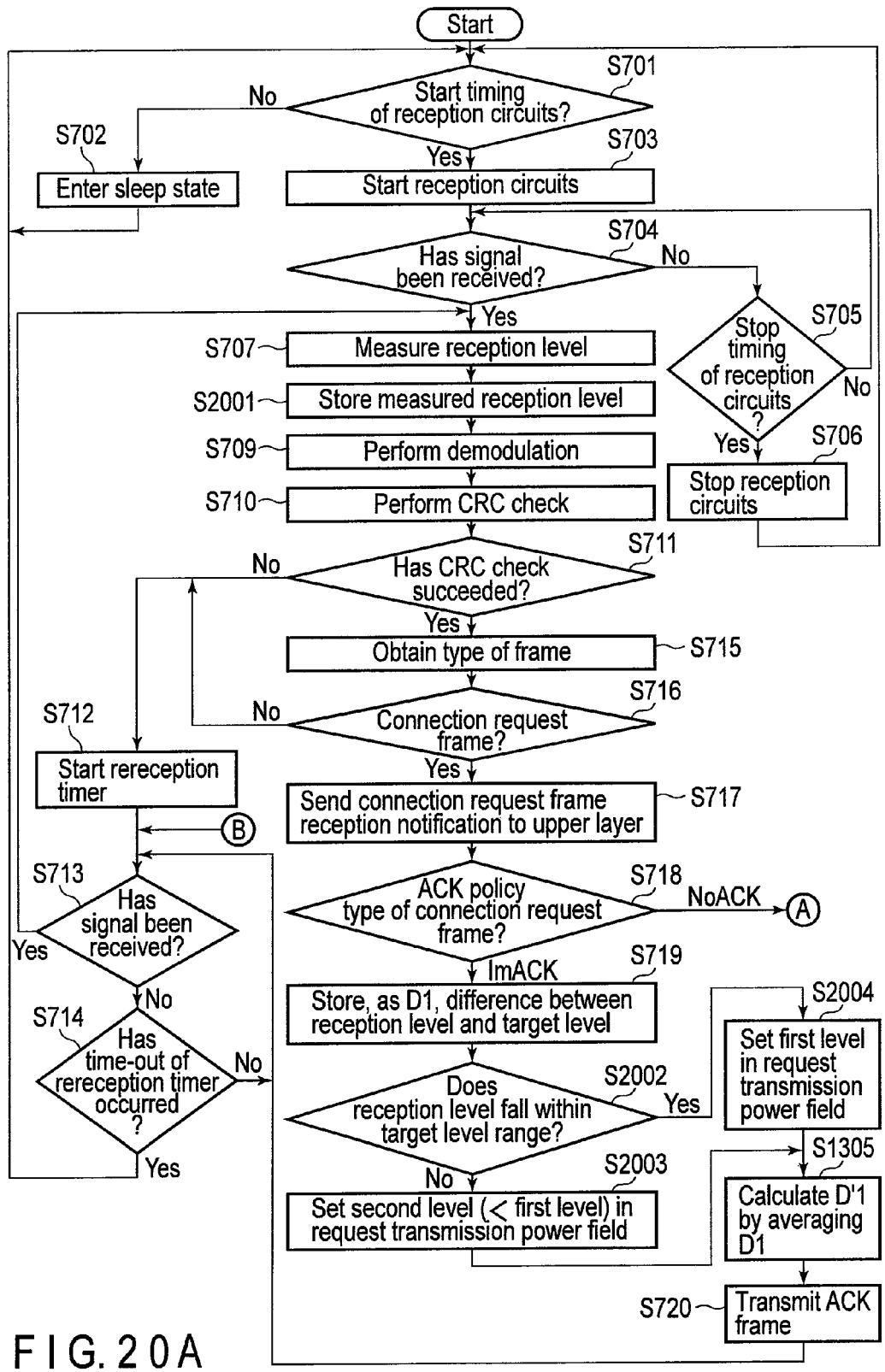
F I G. 20 A

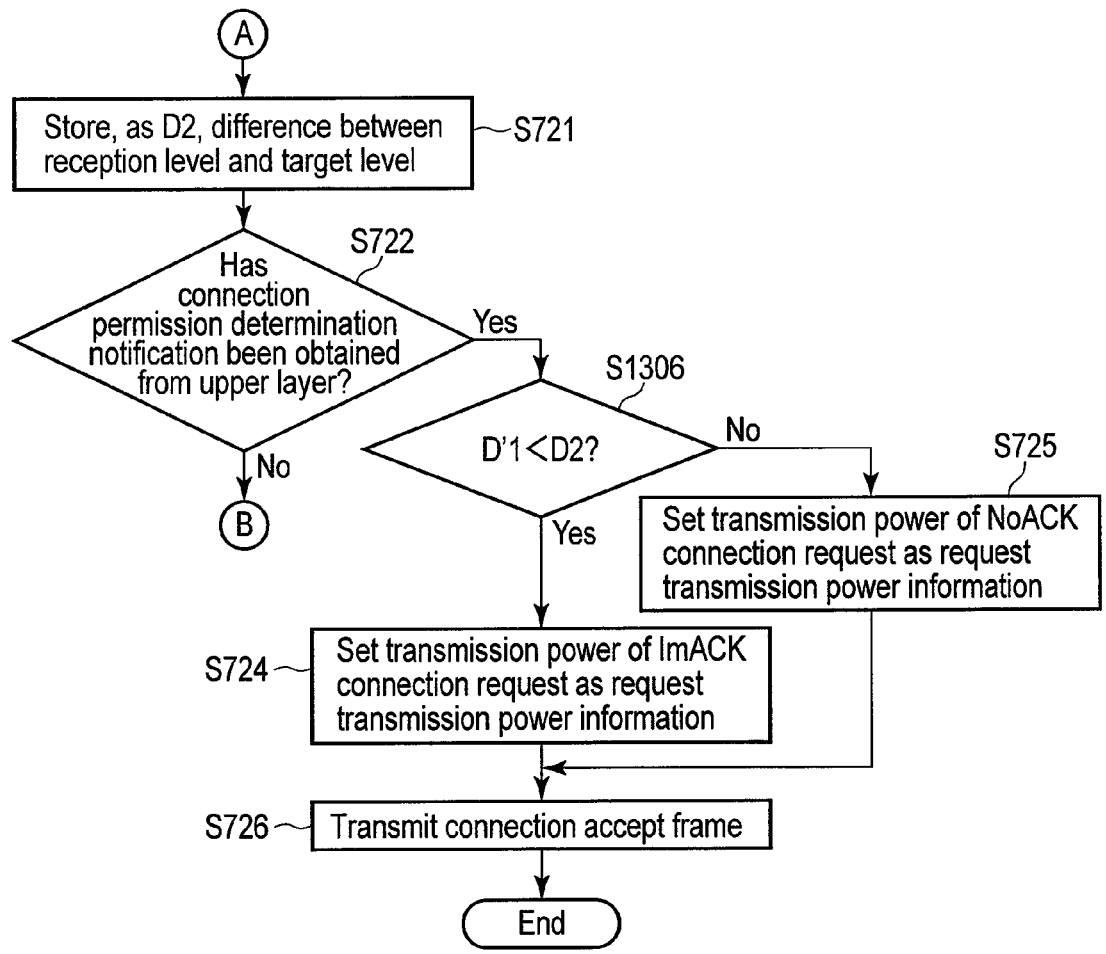
F I G. 2 0 B

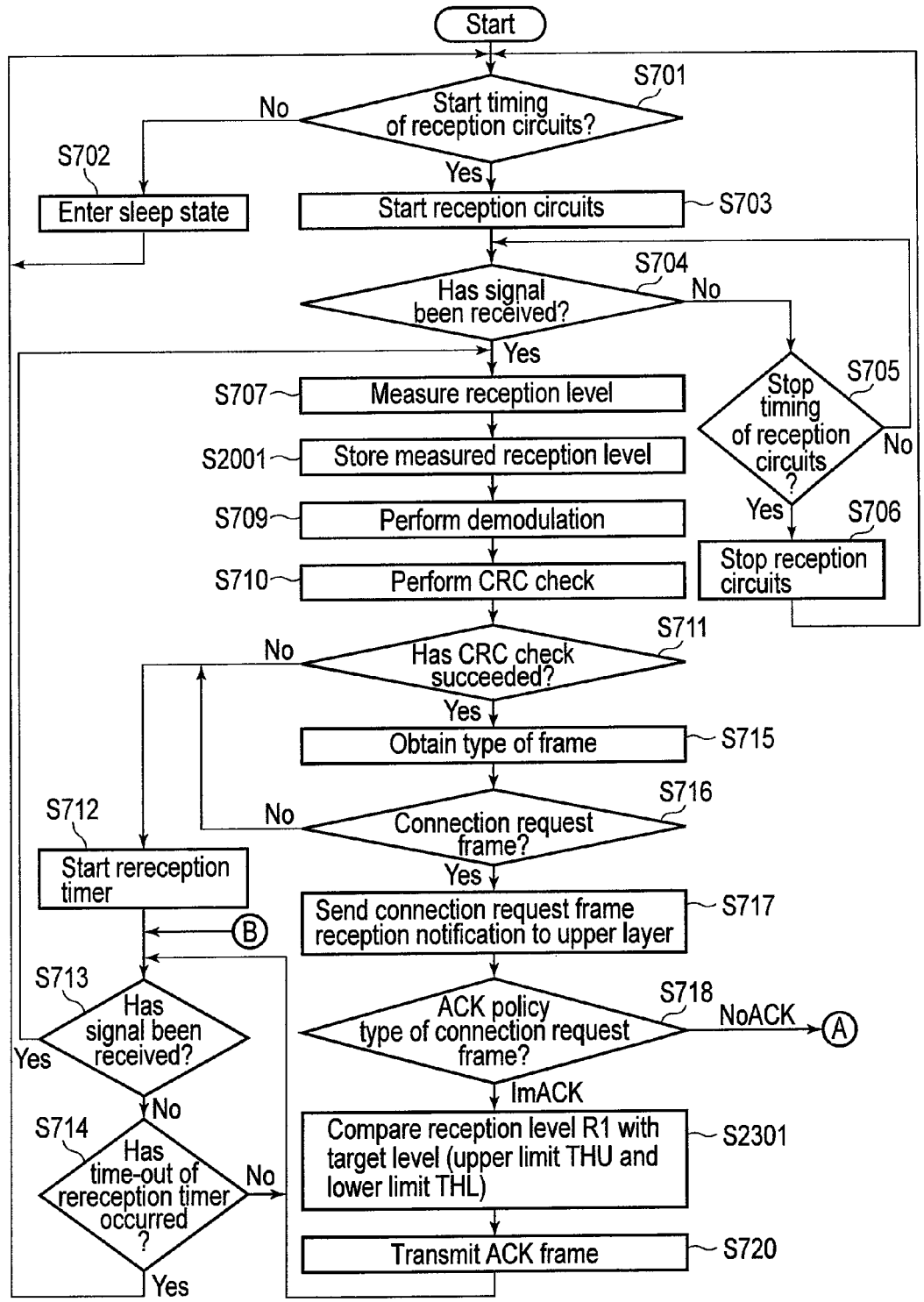
F I G. 23 A

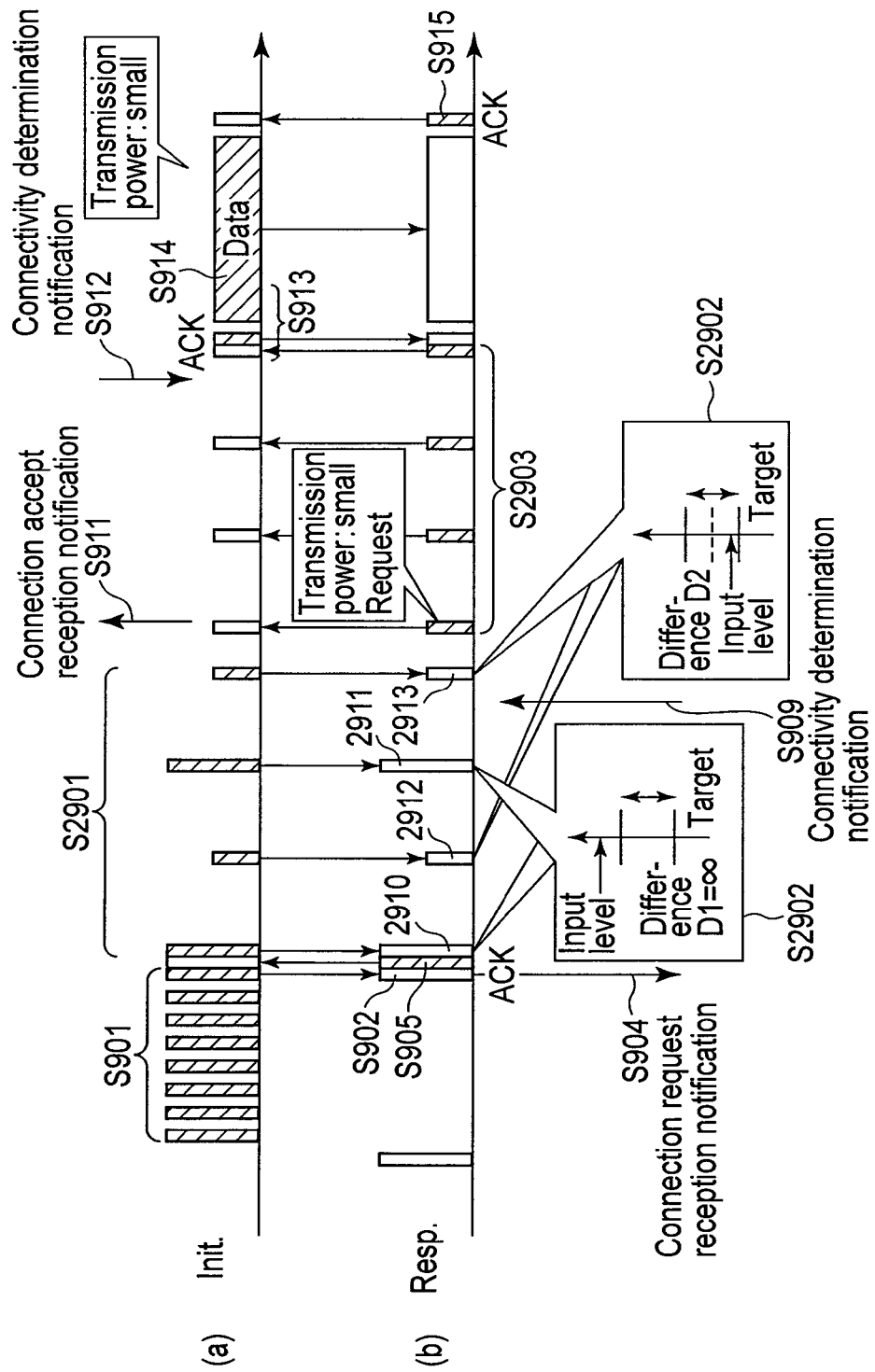
F I G. 29

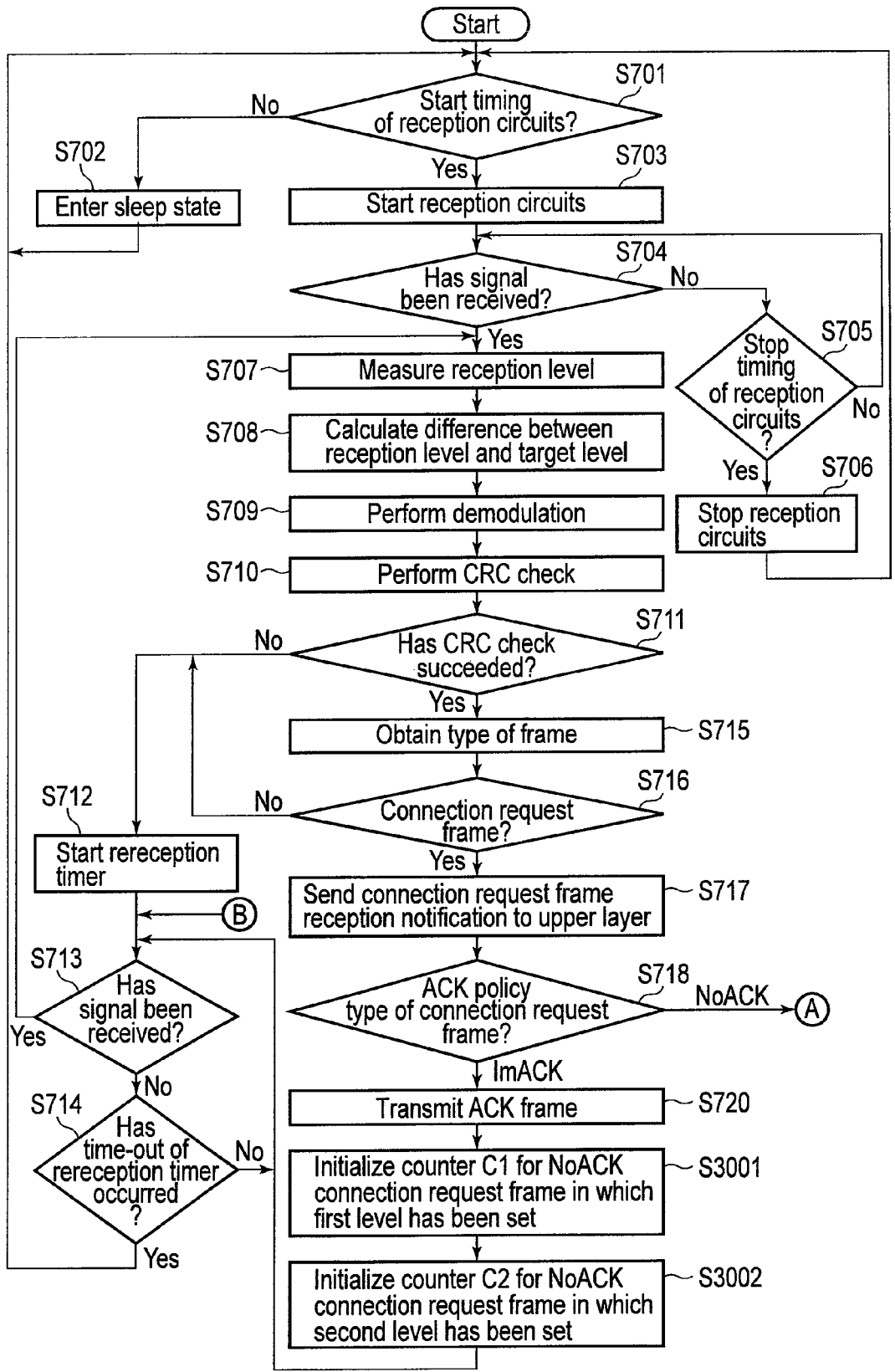
F I G. 30 A

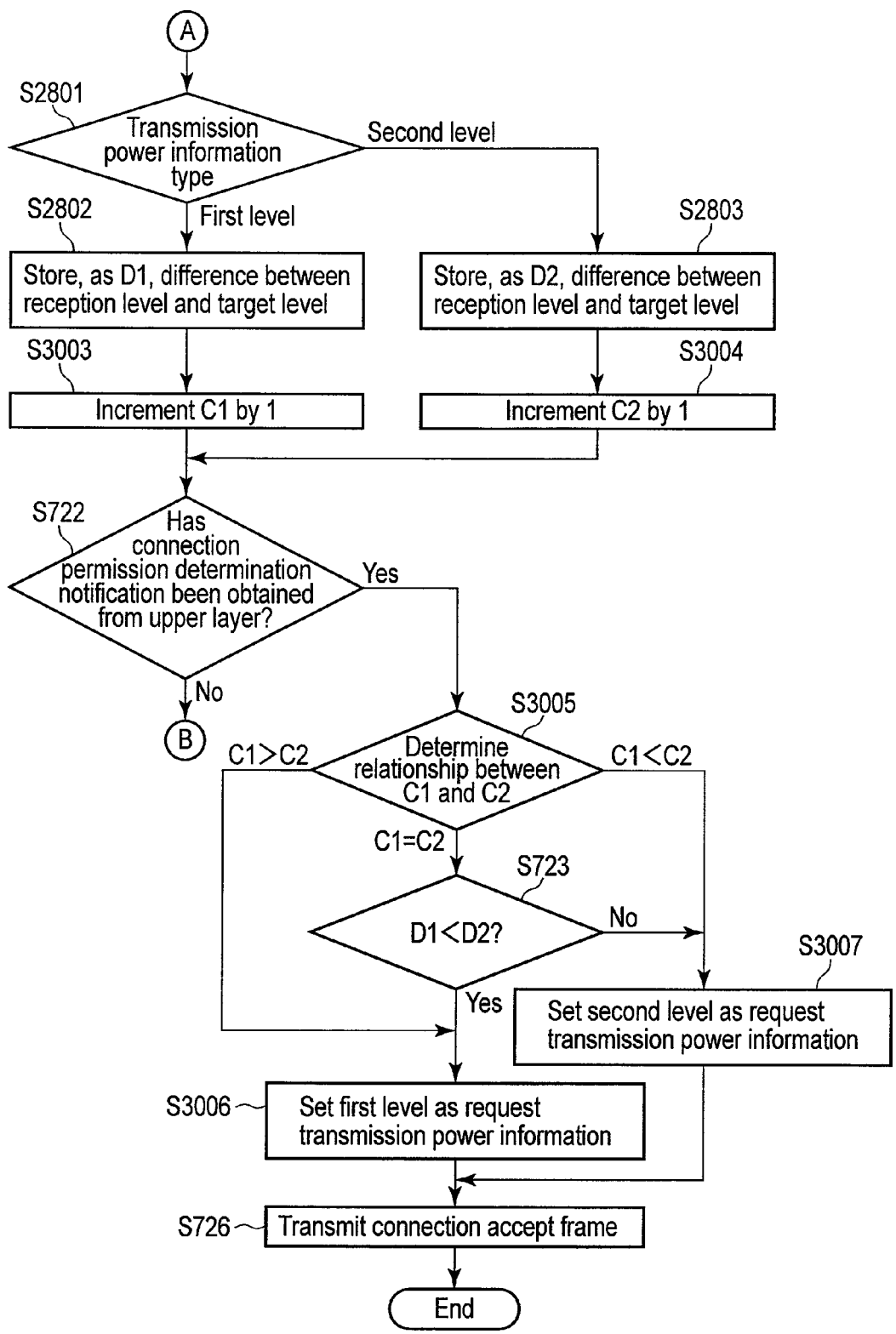
F I G. 3 0 B

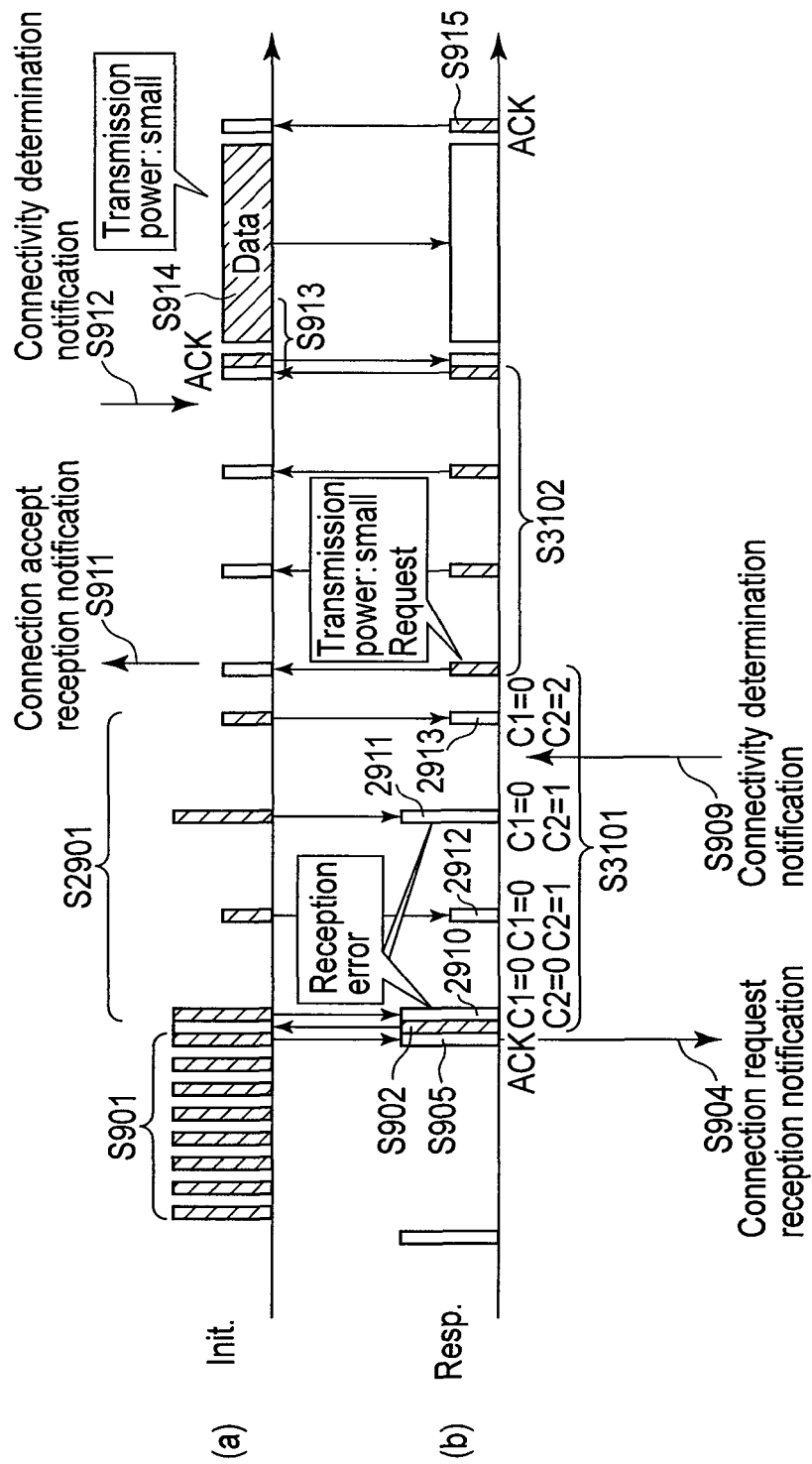
F I G. 31

WIRELESS POWER CONTROL APPARATUS AND METHOD HAVING MULTIPLE TRANSMIT POWER LEVELS

CROSS-REFERENCE TO RELATED APPLICATIONS

This application is based upon and claims the benefit of priority from Japanese Patent Application No. 2012-203174, filed Sep. 14, 2012, the entire contents of which are incorporated herein by reference.

FIELD

Embodiments described herein relate generally to a wireless communication apparatus and method.

BACKGROUND

To establish a close proximity wireless communication connection, it is generally necessary to match the transmission power of a signal to be transmitted from the transmission side with a signal level required by the reception side. There is provided the following method of matching the transmission power with the required signal level. That is, a connection request signal indicating that the transmission side requests connection is transmitted to the reception side with a minimum power, medium power, and maximum power in turn. The transmission side then extracts identification information included in a response signal from the reception side. The transmission side compares the extracted identification information with identification information registered in advance. If there is identification information matching the extracted one, communication is performed using a transmission power equal to that of the connection request signal.

BRIEF DESCRIPTION OF THE DRAWINGS

FIG. 3 is a view illustrating a connection request frame format according to the first embodiment;

FIG. 4 is a view illustrating an acknowledgement frame format according to the first embodiment;

FIG. 5 is a view illustrating a connection accept frame format according to the first embodiment;

FIG. 6 is a flowchart illustrating the operation of an initiator according to the first embodiment;

FIG. 7A is a flowchart illustrating the operation of a responder according to the first embodiment;

FIG. 12 is a flowchart illustrating the operation of an initiator according to the second embodiment;

FIG. 20A is a flowchart illustrating the operation of a responder according to the fourth embodiment;

FIG. 20B is a flowchart illustrating the operation of the responder according to the fourth embodiment;

FIG. 23A is a flowchart illustrating the operation of a responder according to the fifth embodiment;

FIG. 29 is a timing chart showing an example of data frame exchange between wireless communication apparatuses according to the seventh embodiment;

FIG. 30A is a flowchart illustrating the operation of a responder according to the eighth embodiment;

FIG. 30B is a flowchart illustrating the operation of the responder according to the eighth embodiment; and FIG. 31 is a timing chart showing an example of data frame exchange between wireless communication apparatuses according to the eighth embodiment.

DETAILED DESCRIPTION

Figure 1:
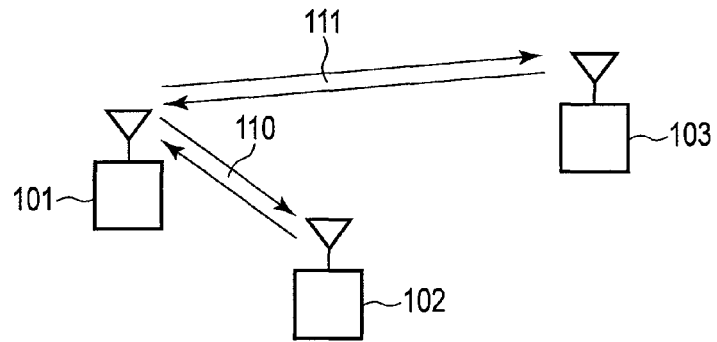
FIG. 1 is a schematic view illustrating a point-to-point close proximity communication system according to an embodiment.

It takes time to determine a transmission power. If, therefore, a connectivity determination notification is received from an upper layer before a transmission power is determined, processing for the notification from the upper layer stands by for decision of a transmission power, resulting in a time longer than that generally taken to establish a connection.

In general, according to one embodiment, a wireless communication apparatus includes a generation unit, a control unit, a transmission unit, a reception unit and an analysis unit. The generation unit is configured to generate a first request frame and a second request frame, the first request frame is a frame for requesting a connection with another communication apparatus and requiring an acknowledgement from the other communication apparatus, the second request frame is a frame for requesting the connection with the other communication apparatus and not requiring the acknowledgement from the other communication apparatus. The control unit is configured to set, as a first value, a magnitude of a transmission power of the first request frame, and set, as a second value smaller than the first value, a magnitude of a transmission power of the second request frame. The transmission unit is configured to transmit the first request frame at a first time interval until an acknowledgement frame is received, and transmit the second request frame at a second time interval until an accept frame is received, the acknowledgement frame is a frame for responding to the first request frame, the accept frame is a frame for responding to the second request frame and including a request transmission power information which indicates information about a transmission power requested by the other communication apparatus, the second time interval is longer than the first time interval. The reception unit is configured to receive the acknowledgement frame and the accept frame. The analysis unit is configured to analyze the request transmission power information. The control unit determines a transmission power of a data frame based on the request transmission power information.

A wireless communication apparatus and a method according to present embodiments will be described below with reference to the accompanying drawings. Note that in the following embodiments, parts denoted by the same reference numerals perform the same operation, and a repetitive description will be omitted.

First Embodiment

FIG. 1 is a schematic view illustrating a wireless communication system according to the embodiment.

FIG. 1 shows a case in which wireless communication apparatuses 101 to 103 perform wireless communication. A wireless communication system according to the embodiment assumes that a plurality of wireless communication apparatuses are not simultaneously connected to one wireless communication apparatus, and wireless communication apparatuses perform point-to-point communication.

For example, when communicating with the wireless communication apparatus 102, the wireless communication apparatus 101 establishes connection with the wireless communication apparatus 102 to transmit/receive (110) a sequence of frames. Upon completion of transmission/reception of the sequence of frames, the wireless communication apparatus 101 executes communication disconnection processing. After that, the wireless communication apparatus 101 establishes connection with the wireless communication apparatus 103 to transmit/receive (111) a sequence of frames. Upon completion of transmission/reception of the sequence of frames, the wireless communication apparatus 101 executes communication disconnection processing.

Note that in the following description, a wireless communication apparatus which transmits a connection request will be referred to as an initiator, and a wireless communication apparatus which transmits a connection accept will be referred to as a responder.

A wireless communication apparatus according to the first embodiment will be described with reference to a block diagram shown in FIG. 2.

The wireless communication apparatus according to the first embodiment includes an antenna 201, a switch 202, a reception unit 203, a level measurement unit 204, a level determination unit 205, a demodulation unit 206, a reception checking unit 207, a reception frame analysis unit 208, a control unit 209, a connection state management unit 210, a memory 211, a frame generation unit 212, and a transmission unit 213.

The antenna 201 is a general antenna for transceiving a signal, and a description thereof will be omitted.

The switch 202 is used to switch the antenna to connect to the reception unit 203 when receiving a signal from a wireless communication apparatus as a communication partner, and to the transmission unit 213 when transmitting a signal to a wireless communication apparatus as a communication partner.

The reception unit 203 receives a signal from the antenna 201 connected by the switch 202, thereby obtaining a reception frame.

The level measurement unit 204 receives the reception frame from the reception unit 203, and measures the power level of the reception frame.

The level determination unit 205 receives the power level of the reception frame from the level measurement unit 204, and compares the power level of the reception frame with a target value of predetermined target reception power level (to also be referred to as a target level), thereby obtaining a determination result.

The demodulation unit 206 receives the reception frame from the level measurement unit 204, and demodulates reception frame.

The reception checking unit 207 receives the demodulated reception frame from the demodulation unit 206, and performs error detection to determine whether or not the received frame is a correct signal. In error detection, for example, it may be decoded a CRC included in the reception frame.

The reception frame analysis unit 208 receives the decoded reception frame from the reception checking unit 207, and extracts information from the frame. The extracted information includes, for example, frame type information and request transmission power information. The frame type information is information for specifying the type of frame; such as a connection request frame, acknowledgement frame, or connection accept frame. The request transmission power information is information about a transmission power required by a responder.

For an initiator, the control unit 209 receives the determination result from the level determination unit 205, the demodulated reception frame from the demodulation unit 206, the request transmission power information from the reception frame analysis unit 208, and a connectivity notification from the connection state management unit 210 (to be described later). After receiving the connectivity notification, the control unit 209 determines, based on the determination result and request transmission power information, a transmission power value with which a frame should be transmitted. For a responder, the control unit 209 determines request transmission power information based on the determination result from the level determination unit 205.

The connection state management unit 210 receives/outputs information about connection, for example, outputs a connection request reception notification to the upper layer of the wireless communication apparatus, and receives a connectivity notification from the upper layer. The received/output information is not limited to them, and includes parameters such as a connection request frame transmission period.

The memory 211 receives and stores transmission data as data to be transmitted from the upper layer to a communication partner.

The frame generation unit 212 receives transmission data from the memory 211 and the determined transmission power value from the control unit 209, and generates a transmission frame. Note that the transmission frame may include information indicating the transmission power value. On the other hand, for the responder, the frame generation unit 212 receives the request transmission power information from the control unit 209, and generates a transmission frame.

The transmission unit 213 receives the transmission power value from the control unit 209 and the transmission frame from the frame generation unit 212, and externally transmits them via the antenna 201 with a transmission power corresponding to the transmission power value.

An example of the frame format of the connection request frame transmitted by the initiator will be described with reference to FIG. 3.

A connection request frame 300 shown in FIG. 3 includes a reception side ID field 301, a transmission side ID field 302, a frame type field 303, an ACK policy field 304, and a CRC parity field 305.

A responder side ID as the transmission destination of the frame is set in the reception side ID field 301. Note that if a destination is not specified, a value such as a broadcast ID or paging ID which does not specify any destination is set.

An initiator side ID as a transmission source which transmits the frame is set in the transmission side ID field 302.

The type of frame is set in the frame type field 303. The type of frame is, for example, a data frame, an acknowledgement frame (to be referred to as an ACK frame hereinafter), a connection request frame, or a connection accept frame. In this example, since the frame is a connection request frame, identification information indicating a connection request frame is set in the frame type field 303.

ACK necessity for the frame is set in the ACK policy field 304. As a setting of ACK response necessity, for example, an ImACK (Immediate ACK) policy or NoACK policy may be set. The ImACK policy indicates that an ACK response is requested a short inter-frame space (SIFS) time after the success of reception of the frame. NoACK policy indicates that no ACK response is needed. Note that it is possible to discriminate between the ImACK policy and NoACK policy by setting, in the ACK policy field 304, identifier "0 (zero)" for the ImACK policy or identifier "1" for the NoACK policy.

A parity bit is set in the CRC (Cyclic Redundancy Check) parity field 305. For example, CRC encoding may be performed for all of the reception side ID field 301, transmission side ID field 302, frame type field 303, and ACK policy field 304, and a generated parity bit is set in the CRC parity field 305.

An example of the frame format of an ACK frame transmitted by the responder will be described with reference to FIG. 4.

An ACK frame 400 shown in FIG. 4 includes a reception side ID field 401, a transmission side ID field 402, a frame type field 403, and a CRC parity field 404.

The ID of the initiator as the destination of the frame is set in the reception side ID field 401.

The ID of the responder which transmits the frame is set in the transmission side ID field 402.

Although the frame type field 403 is the same as that shown in FIG. 3, identification information indicating an ACK frame is set in the frame type field 403 shown in FIG. 4.

CRC encoding is performed for all of the reception side ID field 401, transmission side ID field 402, and frame type field 403, and a generated parity bit is set in the CRC parity field 404.

Note that if the initiator transmits an ACK frame, the value of the reception side ID field 401 and that of the transmission side ID field 402 need only be replaced with each other.

The frame format of a connection accept frame transmitted by the responder will be described with reference to FIG. 5.

A connection accept frame 500 shown in FIG. 5 includes a reception side ID field 501, a transmission side ID field 502, a frame type field 503, an ACK policy field 504, a request transmission power information field 505, and a CRC parity field 506.

The ID of the initiator as the destination of the frame is set in the reception side ID field 501.

The ID of the responder which transmits the frame is set in the transmission side ID field 502.

Although the frame type field 503 is the same as that shown in FIG. 3, identification information indicating a connection accept frame is set in the frame type field 503 shown in FIG. 5.

The ACK policy field 504 is the same as that shown in FIG. 3.

Request transmission power information as information about a transmission power required for the initiator as the communication partner of the frame is set in the request transmission power information field 505. For example, a transmission power such as 10 dBm may be designated, or a transmission power value may be designated using another identifier such as a first level or second level.

For example, CRC encoding may be performed for all of the reception side ID field 501, transmission side ID field 502, frame type field 503, ACK policy field 504, and request transmission power information field 505, and a generated parity bit is set in the CRC parity field 506.

The operation of the initiator will be described with reference to a flowchart shown in FIG. 6.

In step S601, the control unit 209 determines whether or not it is in a connection request frame transmission period. If it is in a connection request frame transmission period, the process proceeds to step S603; otherwise, the process proceeds to step S602.

In step S602, the apparatus enters a standby (sleep) state in which power is supplied to only a minimum number of components necessary to receive a signal, and no power is supplied to other components.

In step S603, the frame generation unit 212 sets the transmission power of a connection request frame to the first level.

In step S604, the transmission unit 213 transmits a connection request frame with an ACK policy of ImACK to a wireless communication apparatus as a responder with the transmission power of the first level.

In step S605, the reception frame analysis unit 208 determines whether or not an ACK frame has been received from the wireless communication apparatus as a responder. If an ACK frame has been received, the process proceeds to step S606; otherwise, the process returns to step S601 to repeat the same processing.

In step S606, the frame generation unit 212 sets the transmission power of the connection request frame to the second level, the transmission power of which is smaller than that of the first level.

In step S607, the control unit 209 starts a transmission timer for a NoACK connection request frame.

In step S608, the transmission unit 213 transmits a connection request frame with an ACK policy of NoACK to the wireless communication apparatus as a responder with the transmission power of the second level.

In step S609, the reception unit 203 stands by for a connection accept frame.

In step S610, the reception frame analysis unit 208 determines whether or not a connection accept frame has been received from the wireless communication apparatus as the responder. If a connection accept frame has been received, the process proceeds to step S612; otherwise, the process proceeds to step S611.

In step S611, the control unit 209 determines whether or not the transmission timing of the connection request frame has been reached. If the transmission timing of the connection request frame has been reached, the process returns to step S606 to repeat the same processing. If the transmission timing of the connection request frame has not been reached, the process returns to step S609 to repeat the same processing.

In step S612, the reception frame analysis unit 208 extracts request transmission power information from the connection accept frame.

In step S613, the control unit 209 determines a transmission power P based on the request transmission power information. In processing of determining the transmission power P based on the request transmission power information, for example, a transmission power may be set the request transmission power information without any change, to the transmission power P.

In step S614, the connection state management unit 210 sends, to the upper layer, a connection request notification indicating that the connection accept frame has been received.

In step S615, the connection state management unit 210 determines whether or not a connection permission notification has been obtained from the upper layer. If a connection permission notification has been obtained, the process proceeds to step S616; otherwise, the process returns to step S609 to repeat the same processing.

In step S616, the transmission unit 213 transmits an ACK frame with the transmission power P determined in step S613.

In step S617, the transmission unit 213 transmits a data frame with the transmission power P. The processing by the wireless communication apparatus as an initiator is then terminated.

The operation of the responder will be described with reference to flowcharts shown in FIGS. 7A and 7B.

In step S701, the control unit 209 determines whether or not the start timing of reception circuits has been reached. If the timing of starting the reception circuits has been reached, the process proceeds to step S703; otherwise, the process proceeds to step S702.

In step S702, the apparatus enters in a sleep state.

In step S703, the control unit 209 starts the reception circuits. More specifically, for the wireless communication apparatus shown in FIG. 2, the control unit 209 starts the reception circuits such as the reception unit 203, level measurement unit 204, level determination unit 205, demodulation unit 206, reception checking unit 207, and reception frame analysis unit 208.

In step S704, the control unit 209 determines whether or not a signal has been received. If a signal has been received, the process proceeds to step S707; otherwise, the process proceeds to step S705.

In step S705, the control unit 209 determines whether or not the stop timing of the reception circuits has been reached. If the stop timing of the reception circuits has been reached, the process proceeds to step S706; otherwise, the process returns to step S704 to repeat the same processing.

In step S706, the reception circuits are stopped, and the process returns to step S701 to repeat the same processing.

In step S707, the level measurement unit 204 measures the signal level of the received signal.

In step S708, the level determination unit 205 calculates the difference between the measured signal level of the received signal and the target level.

In step S709, the demodulation unit 206 demodulates the received signal.

In step S710, the reception checking unit 207 performs a CRC check.

In step S711, the reception checking unit 207 determines whether or not the CRC check has succeeded. If the CRC check has succeeded, the process proceeds to step S715. On the other hand, if the CRC check has not succeeded, that is, the CRC check has failed, the process proceeds to step S712.

In step S712, the control unit 209 sets a reception timer for counting a time until a signal is received, and starts the reception timer.

In step S713, the control unit 209 determines whether or not a signal has been received. If a signal has been received, the process returns to step S707 to repeat the same processing; otherwise, the process proceeds to step S714.

In step S714, the control unit 209 determines whether or not a time-out of the reception timer has occurred. If a time-out of the reception timer has occurred, the process returns to step S701 to repeat the same processing. If no time-out of the reception timer has occurred, the process returns to step S713 to repeat the same processing.

In step S715, the reception frame analysis unit 208 obtains the type of frame.

In step S716, the reception frame analysis unit 208 determines whether or not the received frame is a connection request frame. If the received frame is a connection request frame, the process proceeds to step S717; otherwise, the process returns to step S712 to repeat the same processing.

In step S717, the connection state management unit 210 notifies the upper layer that the connection request frame has been received.

In step S718, the reception frame analysis unit 208 determines whether the ACK policy type of the connection request frame is ImACK or NoACK. If the ACK policy type of the connection request frame is ImACK, the process proceeds to step S719. On the other hand, if the ACK policy type of the connection request frame is NoACK, the process proceeds to step S721.

In step S719, the level determination unit 205 holds, as a difference D1, the difference between the target level and the transmission power level of the ImACK connection request frame. Note that the memory 211 may store the difference D1.

In step S720, the frame generation unit 212 generates an ACK frame, and the transmission unit 213 transmits the ACK frame. After that, the process returns to step S713 to repeat the processing.

In step S721, the level determination unit 205 holds, as a difference D2, the difference between the target level and the reception power level of the NoACK connection request frame.

In step S722, the connection state management unit 210 determines whether or not a connection permission determination notification has been obtained from the upper layer. If a connection permission determination notification has been obtained from the upper layer, the process proceeds to step S723; otherwise, the process returns to step S713 to repeat the same processing.

In step S723, the level determination unit 205 compares, with each other, the differences D1 and D2 calculated in steps S719 and S721, respectively. If D1<D2, that is, D1 is smaller than D2, the process proceeds to step S724. If D1 is equal to or larger than D2, the process proceeds to step S725.

In step S724, the frame generation unit 212 sets, as a request transmission power, the transmission power of the ImACK connection request frame. For example, the frame generation unit 212 may be set, in the request transmission power field 505 of a connection accept frame, an identifier indicating the transmission power the initiator used to transmit the ImACK connection request frame.

In step S725, the frame generation unit 212 sets, as a request transmission power, the transmission power of the NoACK connection request frame.

In step S726, the transmission unit 213 transmits the connection accept frame with the set transmission power. The processing by the wireless communication apparatus as a responder is then terminated.

Level determination processing by the level determination unit 205 will be described with reference to FIGS. 8A and 8B.

Figure 8A:
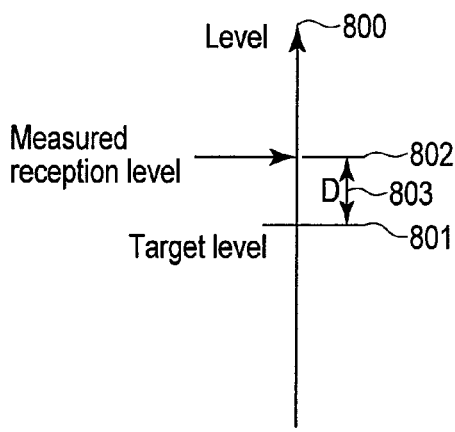
FIG. 8A is a view for explaining level determination processing by a level determination unit.
Figure 8B:
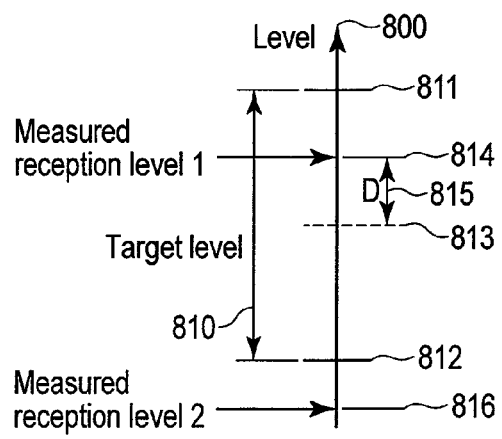
FIG. 8B is a view for explaining level determination processing by a level determination unit.

FIGS. 8A and 8B show the relationship between a reception power level and a target level.

In FIGS. 8A and 8B, an ordinate 800 represents the reception power level of a signal. As shown in FIG. 8A, if a target level 801 is defined as one value, the difference between the target level 801 and a reception power level 802 measured by the level measurement unit 204 is obtained simply by subtracting a smaller level from a larger level. In the example shown in FIG. 8A, the smaller target level 801 is subtracted from the larger reception power level 802, thereby obtaining a difference value D 803.

Figure 2:
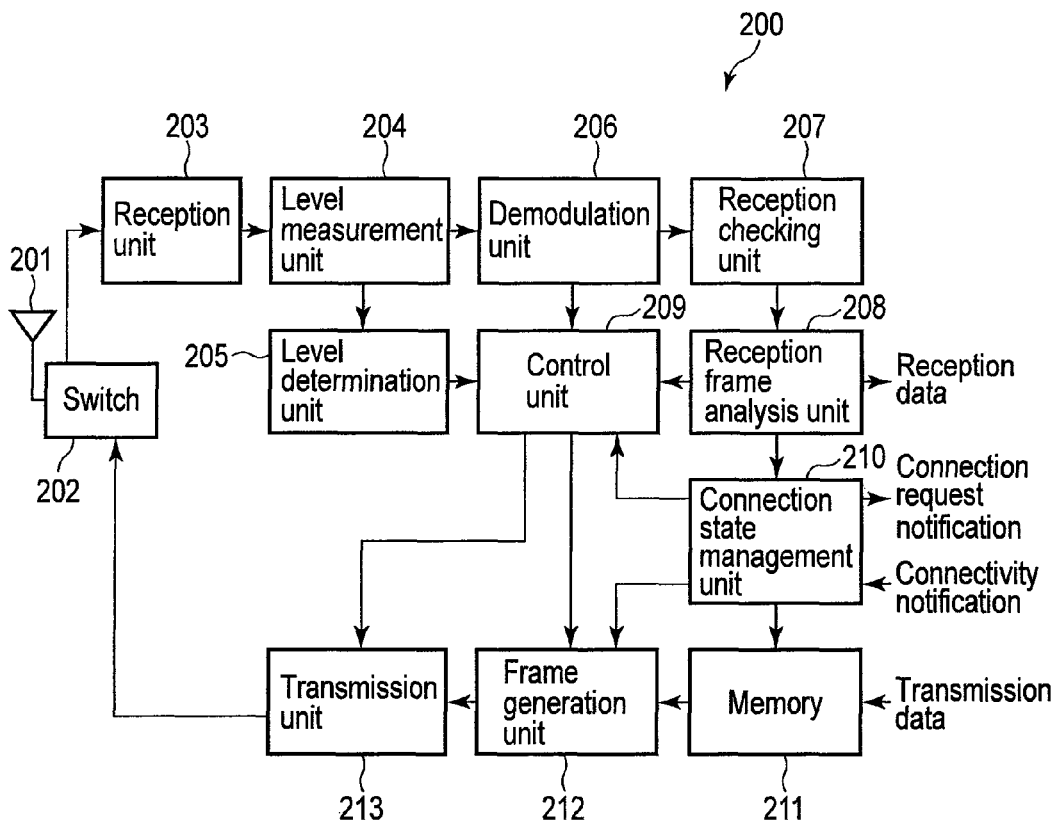
FIG. 2 is a block diagram illustrating a wireless communication apparatus according to the first embodiment.

On the other hand, as shown in FIG. 8B, if a target level 810 is defined as the range from an upper limit 811 to a lower limit 812, a difference value D 815 as the difference between the target level 810 and a reception power level 814 measured by the level measurement unit 204 shown in FIG. 2 can be obtained by subtracting a median value 813 of the target level 810 from the larger reception power level 814. If a reception power level such as a reception power level 816 measured by the level measurement unit 204 falls outside the range of the target level 810, the level determination unit 205 sets the difference between the reception power level 816 and the target level 810 to infinity.

The operation between wireless communication apparatuses according to the first embodiment will be described with reference to FIG. 9.

Figure 9:
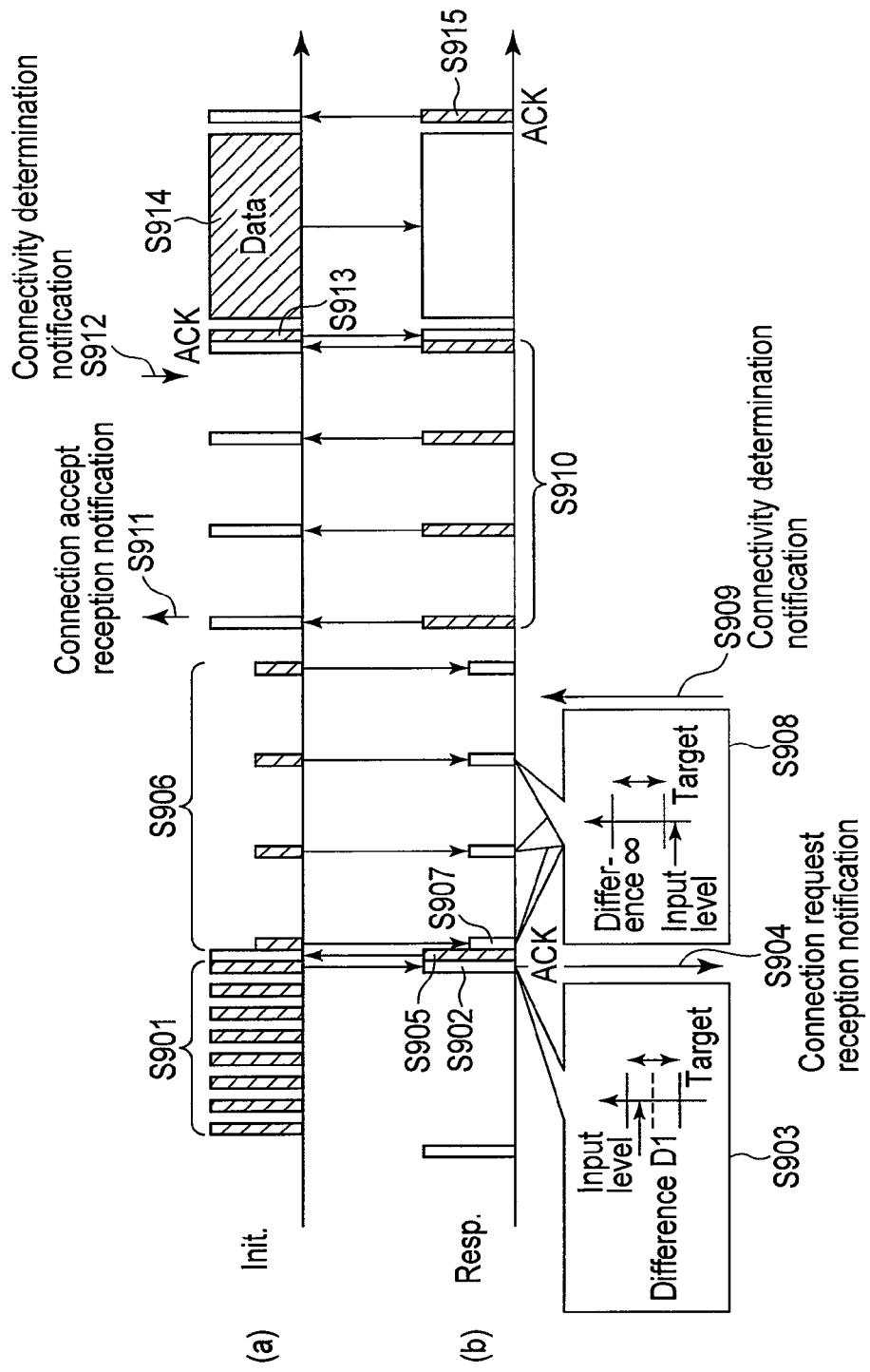
FIG. 9 is a timing chart illustrating an example of data frame exchange between wireless communication apparatuses according to the first embodiment.

FIG. 9 is a timing chart showing processes from establishment of connection between an initiator and a responder up to data frame exchange. (a) of FIG. 9 shows transmission/reception processing executed by the initiator. (b) of FIG. 9 shows transmission/reception processing executed by the responder. Furthermore, a hatched bar represents a frame on the frame transmission side, an open bar represents a frame on the frame reception side, and the height of a bar represents the magnitude of a power value.

In step S901, the initiator repeatedly transmits a connection request frame with an ACK policy of ImACK with the transmission power of the first level at a predetermined transmission time interval during the connection request frame transmission period. In the example shown in FIG. 9, the initiator transmits the connection request frame at the predetermined time interval (to also be referred to as a first time interval) eight times. The connection request frame is repeatedly transmitted by transmitting a set of sequential connection request frames at a time interval longer than the first time interval. This transmission scheme is called burst transmission. In this embodiment, burst transmission is performed until an ACK frame is received from the communication partner.

In step S902, the responder receives the connection request frame transmitted by the initiator.

In step S903, a reception power level is measured, and the difference between the reception power level and a predetermined target level is calculated. Assume in this example that the predetermined target level is defined as a range and D1 represents the difference from the median value of the range.

In step S904, the responder sends a connection request reception notification to the upper layer.

In step S905, the responder transmits, to the initiator, an ACK to the received connection request frame with the transmission power of the first level.

In step S906, upon receiving the ACK, the initiator repeatedly transmits, to the responder, a connection request frame with an ACK policy of NoACK with the transmission power of the second level lower than the first level at a predetermined transmission time interval (to also be referred to as a second time interval). The second time interval is longer than the first time interval.

In step S907, the responder receives the connection request frame transmitted by the initiator.

In step S908, the responder measures the reception power level of the received connection request frame, and calculates the difference between the reception power level and the predetermined target level. Assume in this example that because the predetermined target level is defined as a range, and the measured reception power level falls outside the target level range, the difference is set to ∞ (infinity). The responder compares the difference D1 calculated in step S903 with the difference ∞ calculated in step S908. The responder then determines, as a request transmission power, the first level as the transmission power of the connection request frame with an ACK policy of ImACK, which corresponds to the smaller difference D1.

In step S909, the responder receives a connectivity determination notification from the upper layer.

If the connectivity determination notification received from the upper layer indicates connection permission determination, in step S910 the responder performs random back-off with reference to the NoACK connection request frame received immediately after the connectivity determination notification is received, thereby determining a transmission timing. The responder transmits a connection accept frame, for which the first level has been set as a request transmission power, with the transmission power of the first level at a predetermined time interval.

Upon receiving the connection accept frame from the responder, the initiator outputs a connection accept reception notification to the upper layer in step S911.

In step S912, the initiator receives a connectivity determination notification from its upper layer.

If the connectivity determination notification received from the upper layer indicates connection permission determination, in step S913 the initiator transmits, to the responder, an ACK to the connection accept frame received immediately after the connectivity determination notification is received. With the above processing, connection between the initiator and the responder is established.

In step S914, data frame exchange is performed, and the initiator transmits a data frame with the transmission power of the first level as the request transmission power fed back from the responder.

In step S915, the responder transmits an ACK to the data frame at the same first level as that indicated by the transmission power information fed back to the initiator. The operation between the wireless communication apparatuses according to the first embodiment is then terminated.

According to the first embodiment described above, a connection request frame is transmitted with two transmission powers including the transmission power of the first level and the transmission power of the second level lower than the first level. By receiving feedback on information about one of the transmission powers from a connection destination apparatus, it is possible to use a transmission power suitable for the partner apparatus. This enables to set the reception signal level in the partner apparatus to an appropriate value, thereby improving the reception characteristics.

Second Embodiment

The second embodiment is different from the above embodiment in that an initiator notifies a responder of the number of times of transmission of a connection accept frame. This enables to average the reception power levels of the remaining number of connection request frames to be repeatedly transmitted, thereby improving the measurement accuracy of the reception power level.

Figure 10:
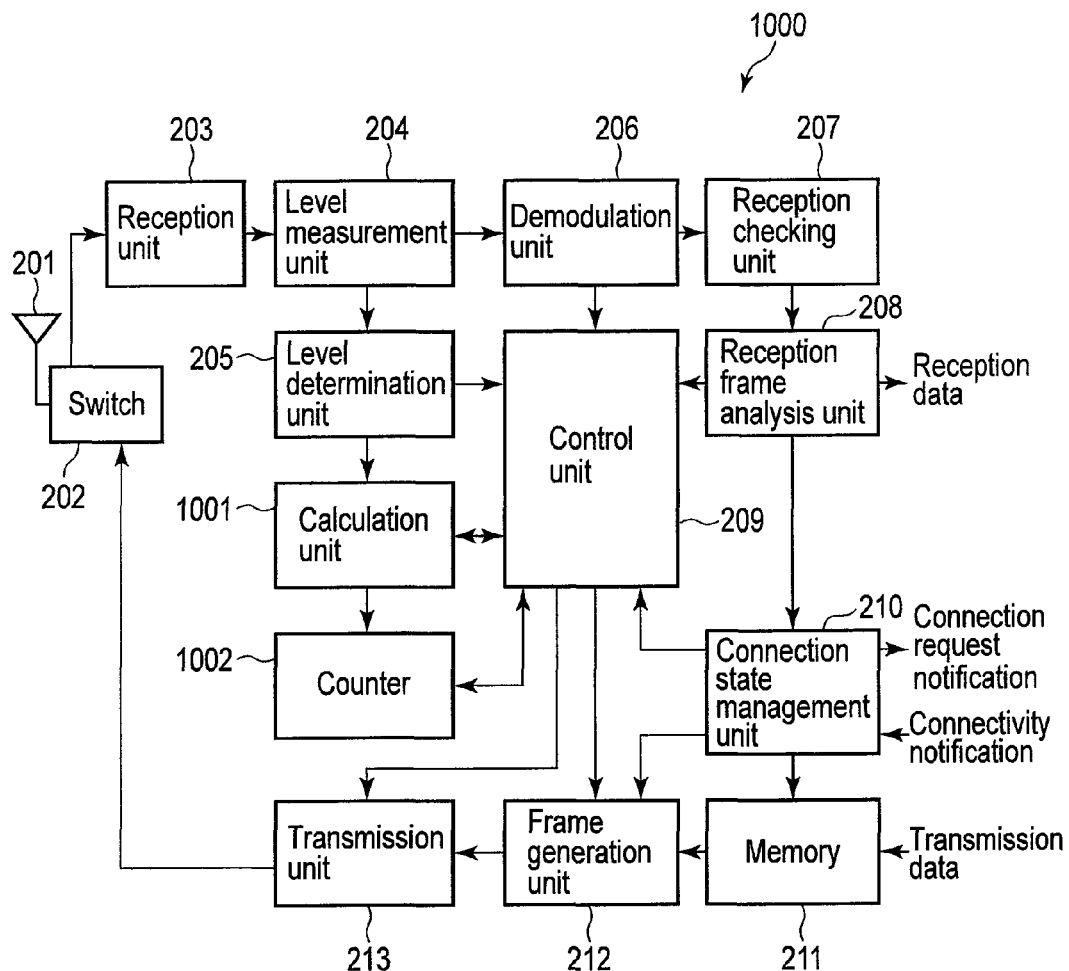
FIG. 10 is a block diagram illustrating a wireless communication apparatus according to the second embodiment.

A wireless communication apparatus according to the second embodiment will be described with reference to a block diagram shown in FIG. 10.

A wireless communication apparatus 1000 according to the second embodiment includes an antenna 201, a switch 202, a reception unit 203, a level measurement unit 204, a level determination unit 205, a demodulation unit 206, a reception checking unit 207, a reception frame analysis unit 208, a control unit 209, a connection state management unit 210, a memory 211, a frame generation unit 212, a transmission unit 213, a calculation unit 1001, and a counter 1002.

The components other than the calculation unit 1001 and counter 1002 perform the same processes as those in the first embodiment, and a description thereof will be omitted.

The calculation unit 1001 calculates the remaining number of times of transmission of a connection request frame.

If the wireless communication apparatus 1000 serves as an initiator, the counter 1002 receives the remaining number of times of transmission from the calculation unit 1001, and decrements the number of times. If the wireless communication apparatus 1000 serves as a responder, the counter 1002 counts the number of times of reception of a connection request frame with an ACK policy of ImACK.

A frame format according to the second embodiment will be described with reference to FIG. 11.

Figure 11:
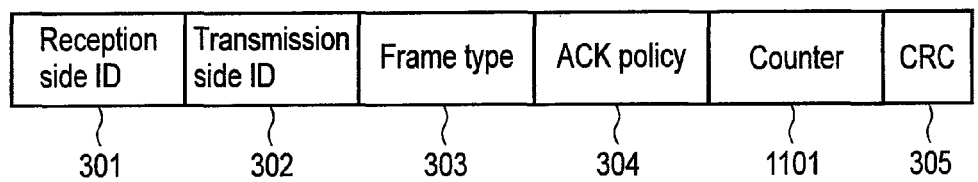
FIG. 11 is a view illustrating the connection request frame format according to the second embodiment.

FIG. 11 shows an example of the frame format of a connection request frame 1100 transmitted by the initiator. The frame format is obtained by adding a counter field 1101 to a connection request frame 300 shown in FIG. 3. A count value associated with the remaining number of times of transmission of the connection request frame is set in the counter field 1101.

The operation of the initiator according to the second embodiment will be described with reference to a flowchart shown in FIG. 12.

FIG. 12 is a flowchart illustrating an example of processes from transmission of a connection request frame by the initiator up to transmission of a data frame, which is obtained by modifying the flowchart shown in FIG. 6. A description of steps of performing the same processes as those in the flowchart of FIG. 6 will be omitted.

In step S1201, the calculation unit 1001 calculates the remaining number R of times of transmission in burst transmission of a connection request frame based on a preset repetition burst transmission period T [sec] and repetition transmission cycle d [sec] of the connection request frame: $R=T/d$.

If the control unit 209 determines in step S601 that it is in a connection request frame transmission period, in step S1202 the frame generation unit 212 sets the remaining number of times of transmission of the connection request frame in the counter field 1101 of the connection request frame shown in FIG. 11, and generates the connection request frame.

In step S1203, the counter 1002 decrements the remaining number of times of transmission of the connection request frame by one. Processing in step S603 and the subsequent steps is the same as that shown in the flowchart of FIG. 6. That is, the remaining number of times of transmission is decremented until an ACK frame is received from the responder. The operation of the initiator according to the second embodiment is then terminated.

The operation of the responder according to the second embodiment will be described with reference to flowcharts shown in FIGS. 13A and 13B.

Figure 7B:
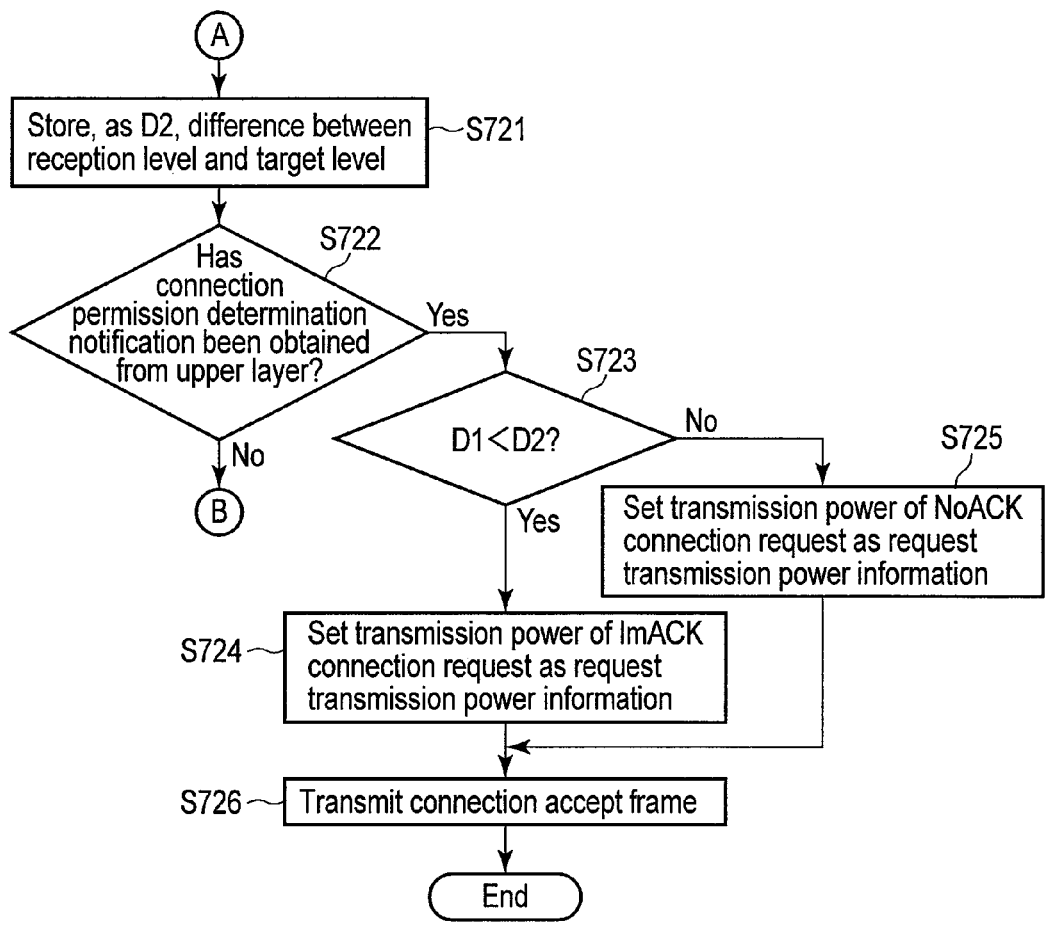
FIG. 7B is a flowchart illustrating the operation of the responder according to the first embodiment.
Figure 13A:
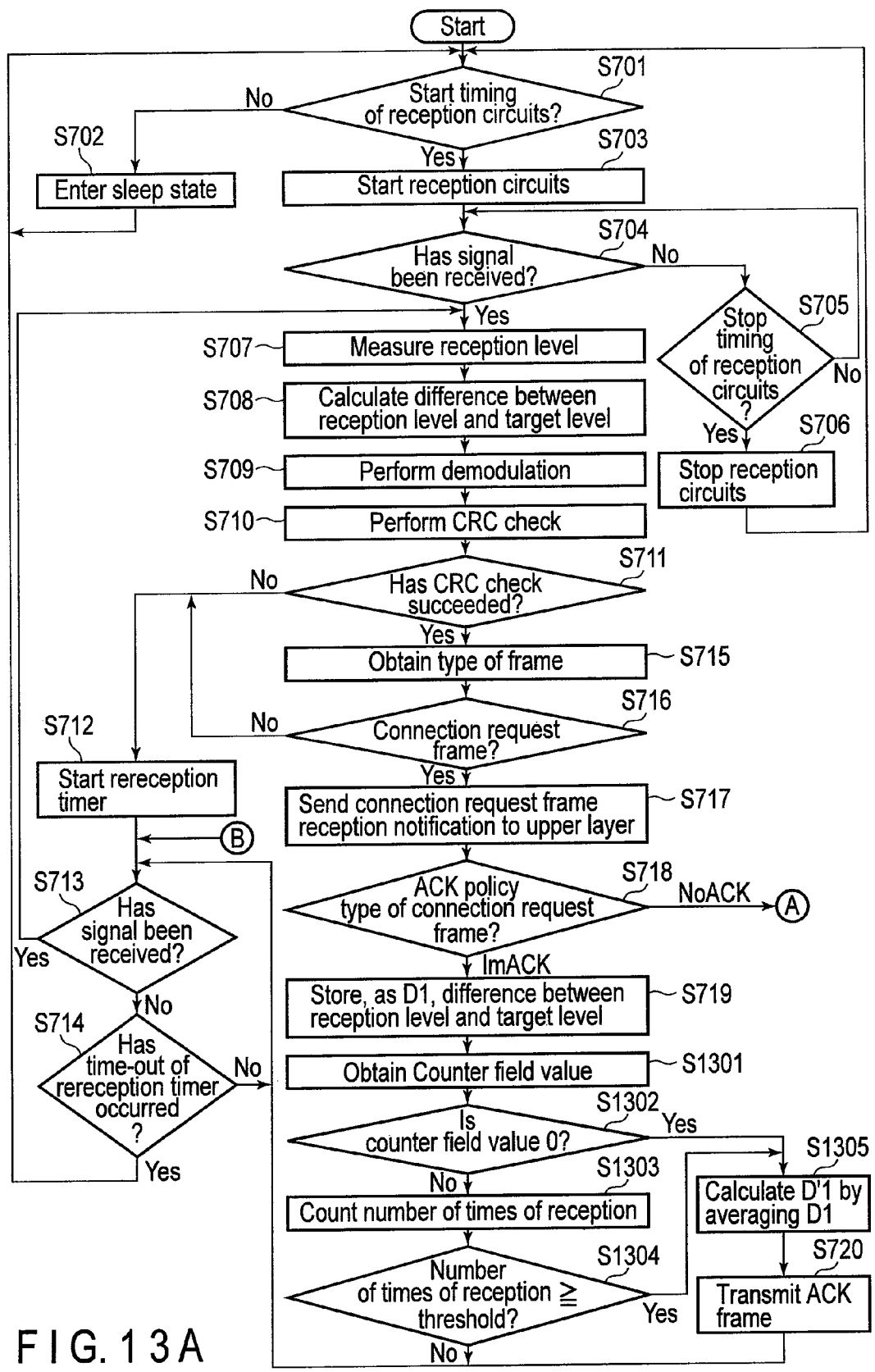
FIG. 13A is a flowchart illustrating the operation of a responder according to the second embodiment.
Figure 13B:
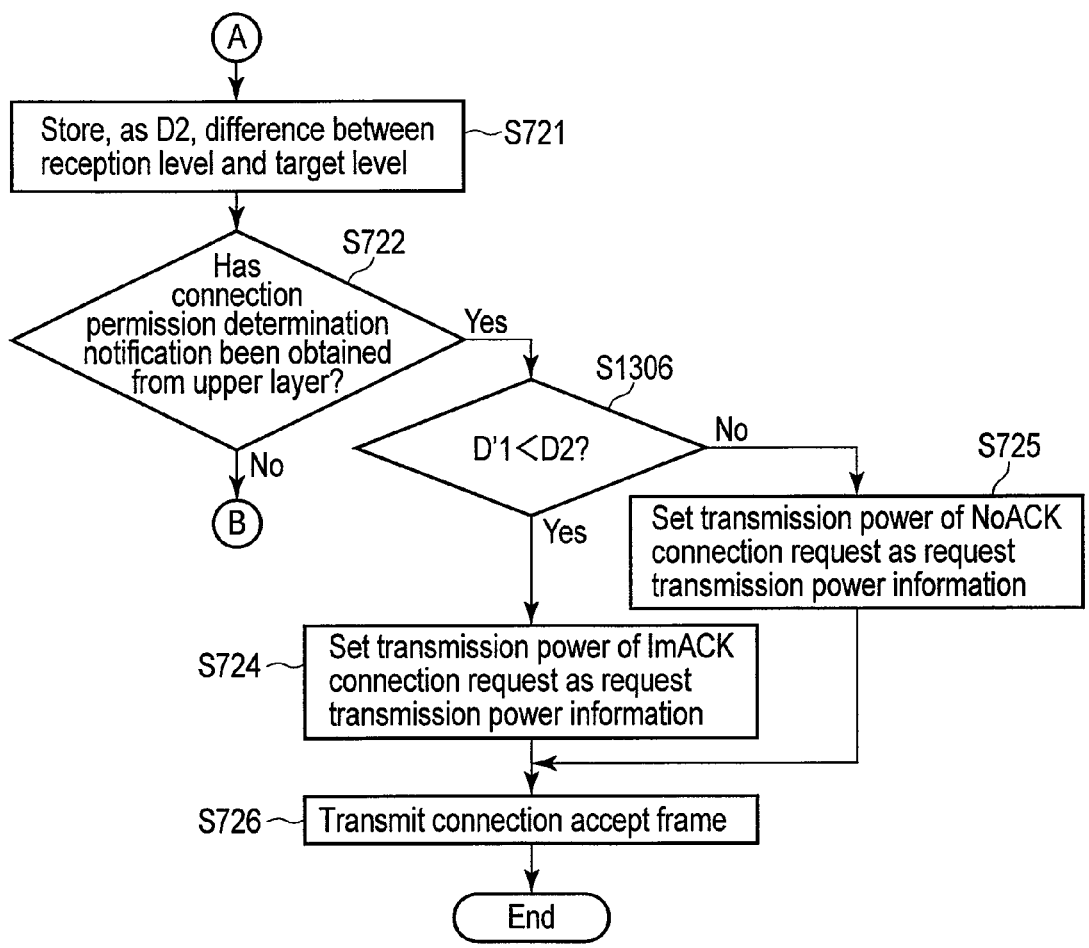
FIG. 13B is a flowchart illustrating the operation of the responder according to the second embodiment.

FIGS. 13A and 13B are flowcharts illustrating an example of processes by the responder from standby for a connection request frame up to transmission of a connection accept frame, which are obtained by modifying the flowcharts shown in FIGS. 7A and 7B. A description of steps of performing the same processes as those in the flowcharts of FIGS. 7A and 7B will be omitted.

In step S1301, the reception frame analysis unit 208 obtains the value of the counter field.

In step S1302, the control unit 209 determines whether or not the value of the counter field is zero. If the value of the counter field is zero, the process proceeds to step S1305; otherwise, the process proceeds to step S1303.

In step S1303, the counter 1002 counts the number of times of reception of a connection request frame with an ACK policy of ImACK.

In step S1304, the control unit 209 determines whether the number of times of reception of the connection request frame with an ACK policy of ImACK is not less than a threshold. If the number of times of reception is not less than the threshold, the process proceeds to step S1305; otherwise, the process returns to step S713 to repeat the same processing.

In step S1305, the level determination unit 205 calculates the average of the stored differences D1, thereby obtaining D'1.

If it is determined in step S722 that a connection permission determination notification has been received from the upper layer, the level determination unit 205 compares D'1 and D2 with each other in step S1306. If D'1 is smaller than D2, the process proceeds to step S724; otherwise, the process proceeds to step S725. Other processing is the same as that shown in the flowcharts of FIGS. 7A and 7B. The operation of the initiator on the reception side according the second embodiment is then terminated.

The operation of the wireless communication apparatus according to the second embodiment will be described with reference to FIG. 14.

Figure 14:
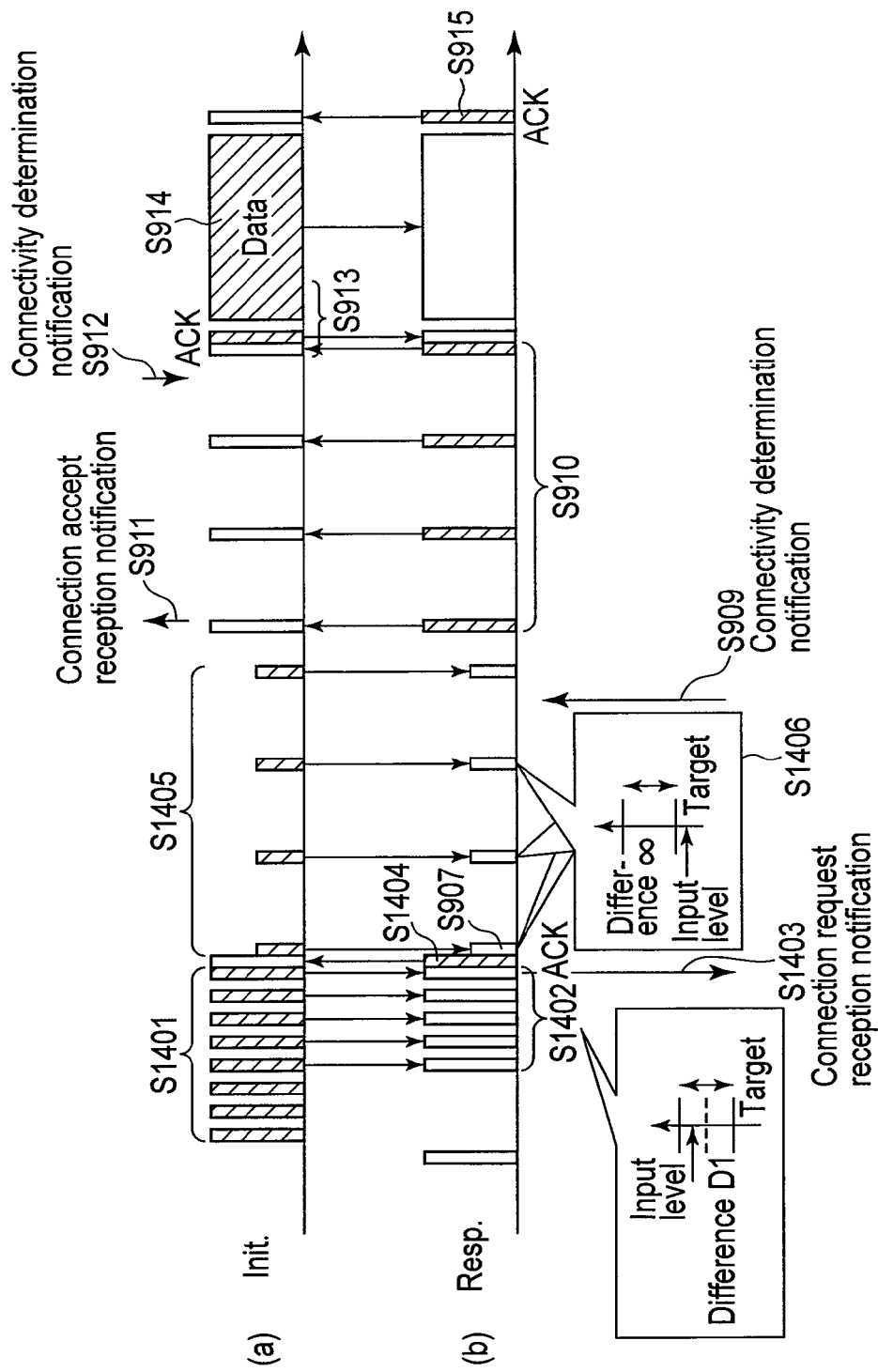
FIG. 14 is a timing chart illustrating an example of data frame exchange between wireless communication apparatuses according to the second embodiment.

FIG. 14 is a timing chart showing processes from establishment of connection between an initiator and a responder up to data frame exchange. (a) of FIG. 14 shows transmission/reception processing executed by the initiator. (b) of FIG. 14 shows transmission/reception processing executed by the responder.

In step S1401, the initiator repeatedly transmits connection request frames with an ACK policy of ImACK with a transmission power of a first level at a predetermined transmission time interval during a connection request frame transmission period.

In step S1402, the responder receives the connection request frame transmitted by the initiator until the number of times of transmission reaches a predetermined threshold or a count value included in the connection request frame is zero. In this case, with respect to R(k) (k is a natural number) indicating a reception signal, a reception power level is measured, and a difference D1(k) between the reception power level and a predetermined target level is calculated.

Assume that the predetermined target level is defined as a range, and D1(k) represents the difference from the median value of the range. Upon completion of repetitive reception of the ImACK connection request frame, an average value D'1 of the calculated differences D1(k) is calculated by D'1=(1/K)$\Sigma$D1(k) where K represents the number of times of reception of the connection request frame with an ACK policy of ImACK.

In step S1403, the responder sends a connection request reception notification to the upper layer.

In step S1404, the responder transmits, to the initiator, an ACK frame to the received connection request frame with the transmission power of the first level.

In step S1405, after receiving the ACK, the initiator repeatedly transmits a connection request frame with an ACK policy of NoACK with a transmission power of a second level lower than the first level at a second time interval.

In step S1406, the responder measures a reception power level when receiving the connection request frame from the initiator, and calculates the difference between the reception power level and the predetermined target level. Assume that the measured reception power level falls outside the target level range, and thus the difference is set to ∞ (infinite). The responder compares the difference D'1 calculated in step S1402 with the difference ∞ calculated in step S1405, and determines, as a request transmission power, the first level as the transmission power of the ImACK connection request frame corresponding to the smaller difference D'1. Subsequent processing is the same as that between the wireless communication apparatuses according to the first embodiment shown in FIG. 9, and a description thereof will be omitted. The operation between the wireless communication apparatuses according to the second embodiment is then terminated.

According to the second embodiment described above, it is possible to identify the remaining number of connection request frames to be repeatedly transmitted. Therefore, it is possible to calculate the average of the reception power levels of the remaining number of connection request frames, and compare it with the target, thereby improving the measurement accuracy of the reception power level while keeping the connection time short.

Third Embodiment

The third embodiment is different from the above embodiments in that an ACK frame including a transmission power request is transmitted to an initiator. This enables to receive a signal with an appropriate transmission power from the initiator, thereby establishing connection.

The frame format of an ACK frame according to the third embodiment will be described with reference to FIG. 15.

Figure 15:
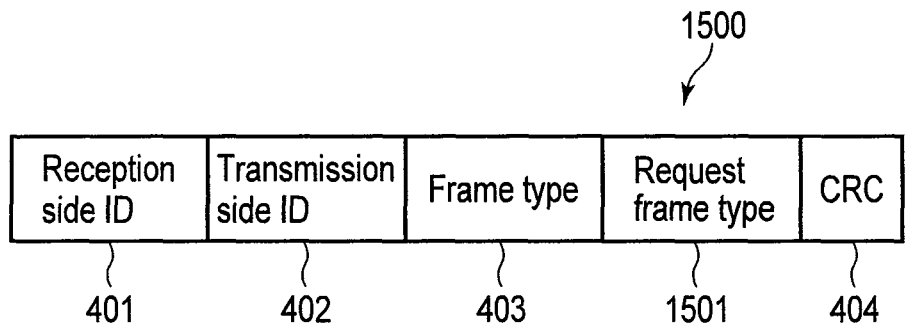
FIG. 15 is a view illustrating an acknowledgement frame format according to the third embodiment.

FIG. 15 shows an example of the frame format of an ACK frame 1500 transmitted by a responder according to the third embodiment. The frame format is obtained by adding a request frame type field 1501 to an ACK frame 400 shown in FIG. 4. An identifier indicating the type of frame requested by the responder is set in the request frame type field 1501.

The operation of the responder according to the third embodiment will be described with reference to flowcharts shown in FIGS. 16A and 16B.

Figure 16A:
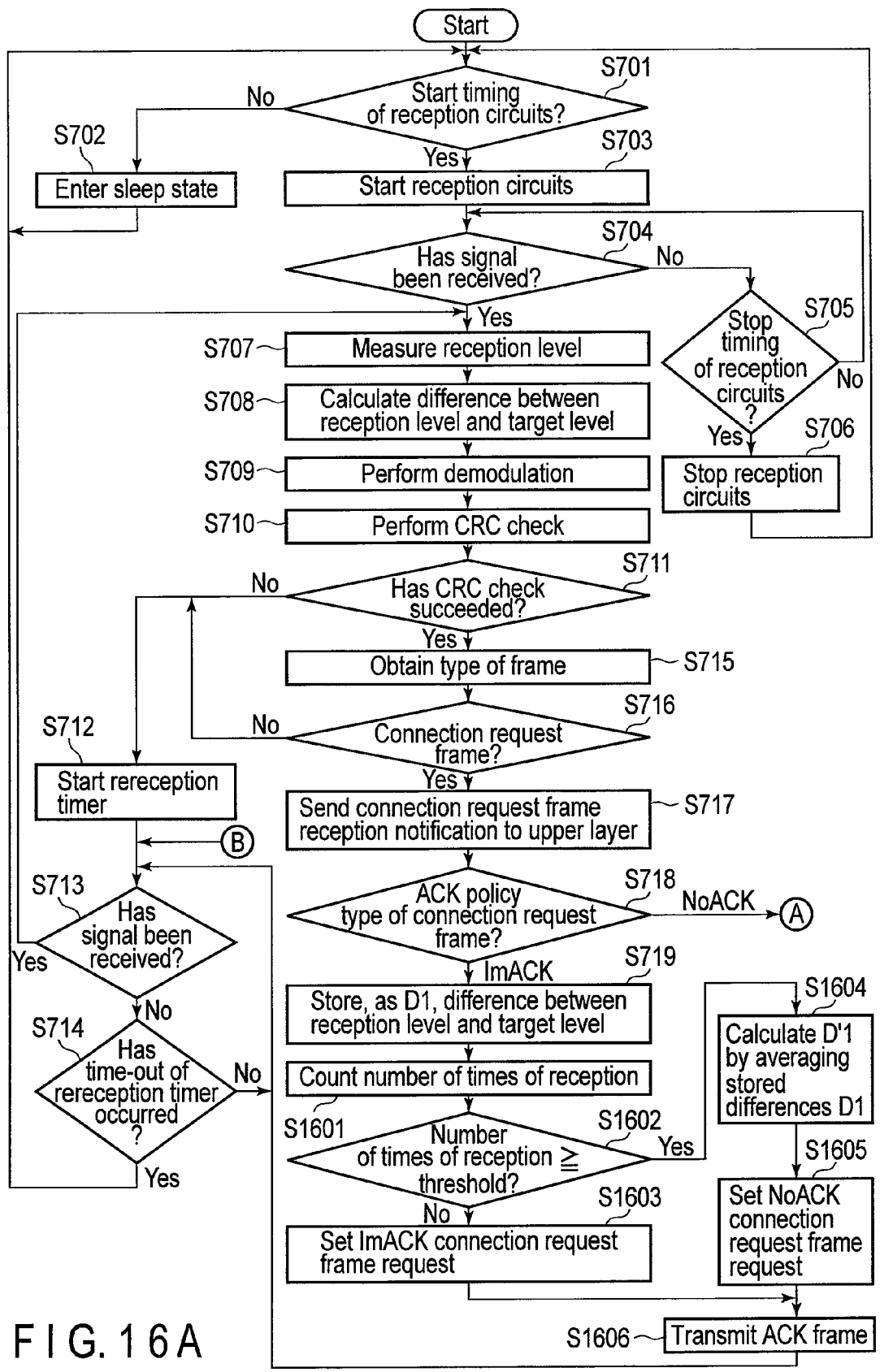
FIG. 16A is a flowchart illustrating the operation of a responder according to the third embodiment.
Figure 16:
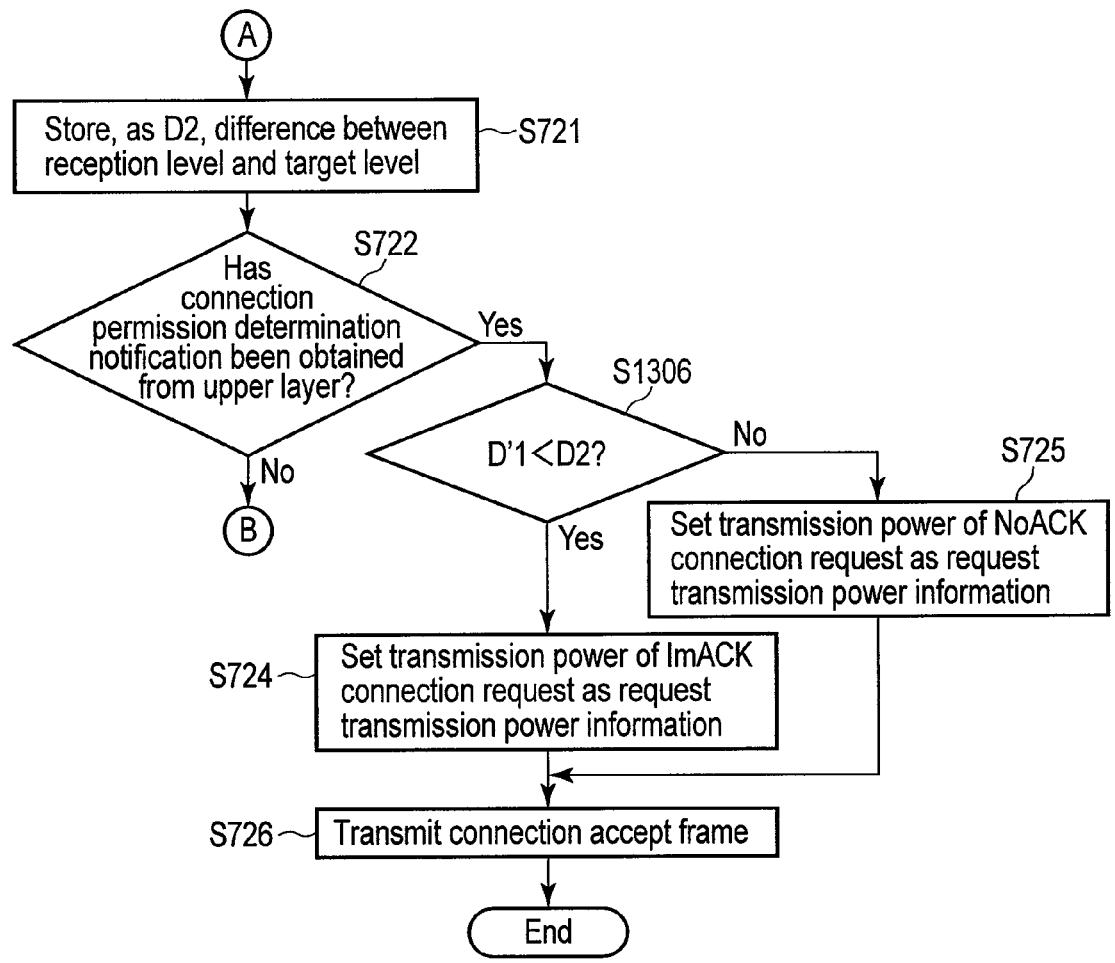
FIG. 16B is a flowchart illustrating the operation of the responder according to the third embodiment.

The flowcharts shown in FIGS. 16A and 16B are obtained by modifying the flowcharts shown in FIGS. 13A and 13B, and thus a description of steps of performing the same processes as those in the flowcharts shown in FIGS. 13A and 13B will be omitted. The responder is the same as that shown in FIG. 10.

In step S1601, a counter 1002 counts the number of times of reception of a connection request frame with an ACK policy of ImACK.

In step S1602, a control unit 209 determines whether or not the number of times of reception is not less than a threshold. If the number of times of reception is not less than the threshold, the process proceeds to step S1604; otherwise, the process proceeds to step S1603.

In step S1603, a frame generation unit 212 sets, in the request frame type field 1501 of the ACK frame shown in FIG. 15, information about a connection request frame with an ACK policy of ImACK.

In step S1604, a level determination unit 205 calculates an average value D'1 of stored differences D1.

In step S1605, the frame generation unit 212 sets, in the request frame type field 1501 of the ACK frame, information about a connection request frame with an ACK policy of NoACK.

In step S1606, the responder transmits the ACK frame to the initiator. The operation of the wireless communication apparatus on the reception side according to the third embodiment is then terminated.

Figure 17:
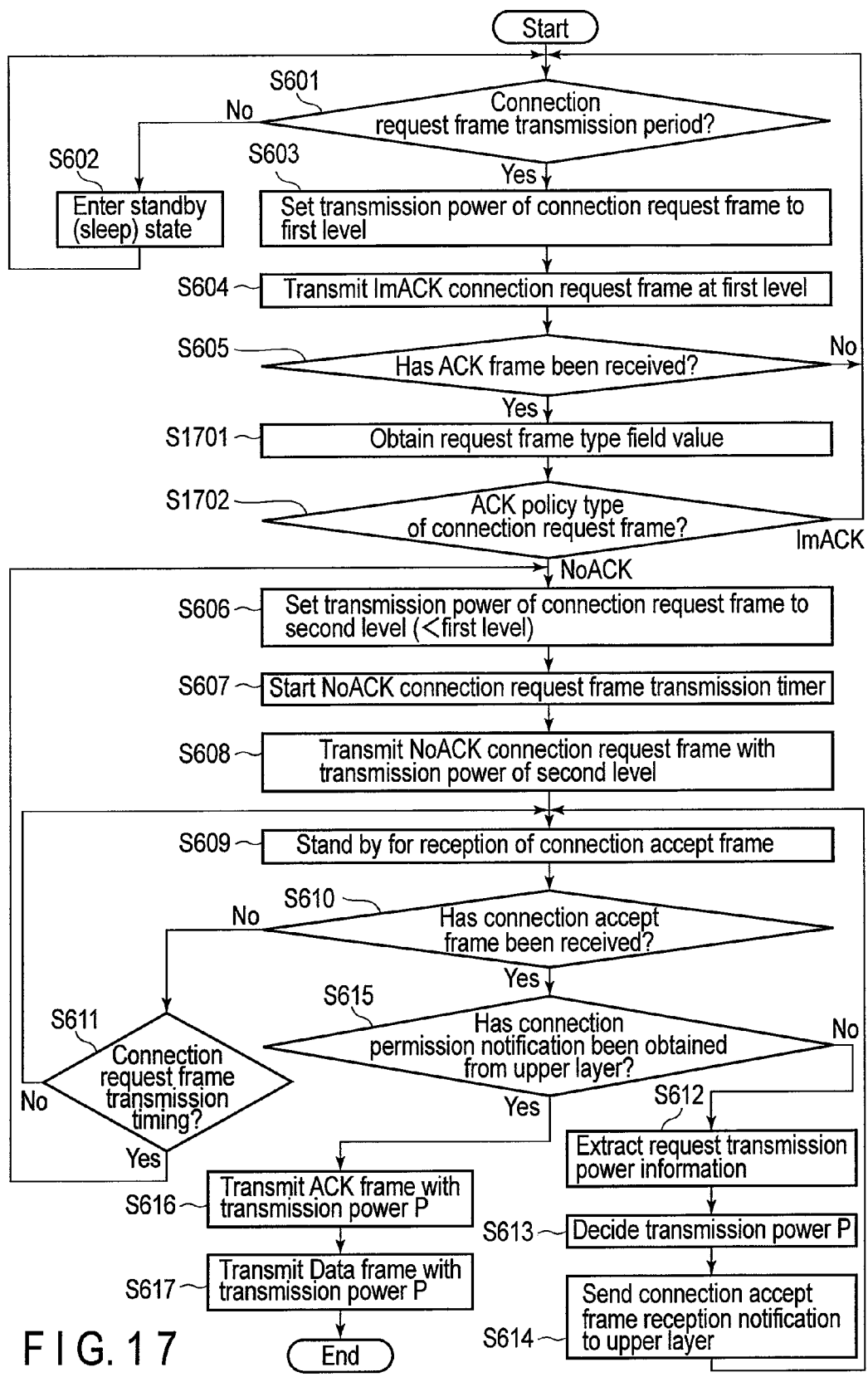
FIG. 17 is a flowchart illustrating an initiator according to the third embodiment.

The operation of an initiator according to the third embodiment will be described with reference to a flowchart shown in FIG. 17. The flowchart shown in FIG. 17 is obtained by modifying the flowchart shown in FIG. 6. A description of steps of performing the same processes as those in the flowchart shown in FIG. 6 will be omitted.

If it is determined in step S605 that the ACK frame has been received, in step S1701 a reception frame analysis unit 208 obtains the value which is set in the request frame type field 1501.

In step S1702, the reception frame analysis unit 208 determines the ACK policy type information of the connection request frame. If the ACK policy of the connection request frame is ImACK, the process proceeds to step S601 to repeat the processing. If the ACK policy of the connection request frame is NoACK, processing in step S606 and the subsequent steps is repeated. The operation of the initiator according to the third embodiment is then terminated.

Figure 18:
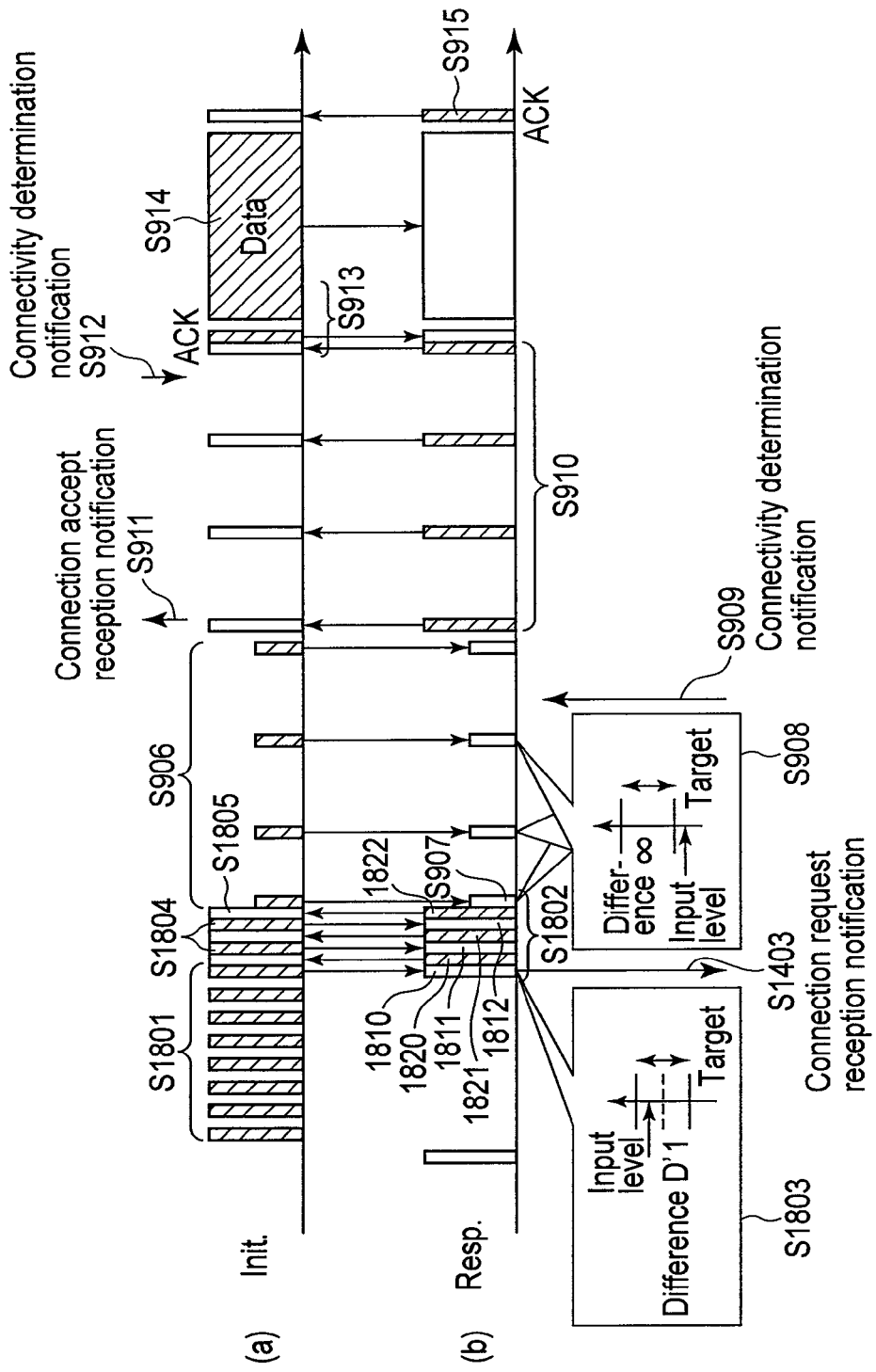
FIG. 18 is a timing chart illustrating an example of data frame exchange between wireless communication apparatuses according to the third embodiment.

The operation between wireless communication apparatuses according to the third embodiment will be described with reference to FIG. 18. FIG. 18 is a timing chart showing processes from connection between an initiator and a responder up to data frame exchange. (a) of FIG. 18 shows transmission/reception processing executed by the initiator. (b) of FIG. 18 shows transmission/reception processing executed by the responder.

In step S1801, the initiator repeatedly transmits an ImACK connection request frame with a transmission power of a first level at a first time interval during a connection request frame transmission period.

In step S1802, the responder receives the connection request frame transmitted by the initiator until the number of times of reception of the connection request frame reaches a threshold. In the example shown in FIG. 18, assume that the threshold in step S1602 of FIG. 16A is three. The responder responds, with ACK frames, to a first received connection request frame 1810 and a second received connection request frame 1811, respectively. More specifically, the responder sets, in the frame type field 403 of an ACK frame (an ACK frame 1820 or 1821 in FIG. 18) as a response, information indicating a connection request frame with an ACK policy of ImACK, and transmits the ACK frame. Furthermore, the responder sets, in the request frame type field 1501 of an ACK frame 1822 as a response to reception of a third connection request frame 1812, information indicating a connection request frame with an ACK policy of NoACK, and transmits the ACK frame.

In step S1803, the responder calculates a difference D1(k) between a reception power level and a target level for each connection request frame, and stores the calculated difference. After receiving the ImACK connection request frame three times, the responder calculates an average value D'1 of the stored differences D1(k) by D'1=(⅓)ΣD1(k).

In step S1804, the initiator receives the ACK frame having a frame type field 403 set with information indicating an ImACK connection request frame, and transmits an ImACK connection request frame with the transmission power of the first level.

In step S1805, the initiator receives the ACK frame having the frame type field 403 set with information indicating a connection request frame with an ACK policy of NoACK, and transmits a connection request frame with an ACK policy of NoACK with a transmission power of a second level lower than the first level. Subsequent processing is the same as that shown in the timing chart of FIG. 14, and a description thereof will be omitted.

According to the third embodiment described above, the responder can request to transmit a connection request frame with the transmission power of the first level, and the initiator repeatedly transmits a connection request frame at the first level requested by the initiator, thereby averaging the reception power levels of the plurality of received connection request frames. This results in improvement in measurement accuracy of the reception power level.

Fourth Embodiment

The fourth embodiment is different from the above-described embodiments in that a responder feeds back, to an initiator, information about a transmission power such that a reception power level falls within a target level range. This can set the reception power level in the responder to an appropriate value, thereby improving the reception characteristics.

An example of the frame format of an ACK frame according to the fourth embodiment will be described with reference to FIG. 19.

Figure 19:
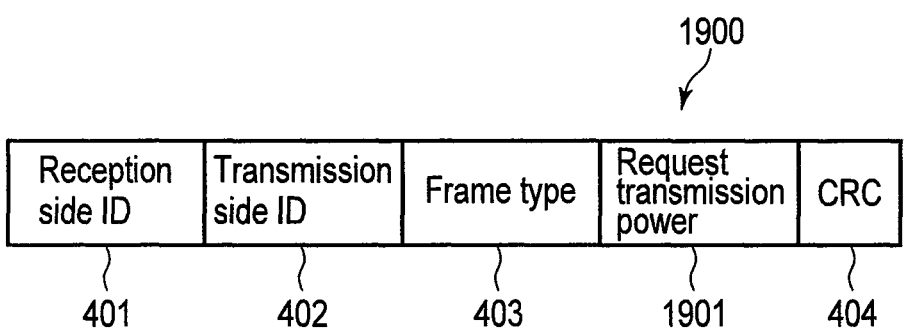
FIG. 19 is a view illustrating the frame format of an acknowledgement frame according to the fourth embodiment.

FIG. 19 shows the frame format of an ACK frame 1900 transmitted by a responder on the reception side, which is obtained by adding a request transmission power field 1901 to an ACK frame 400 shown in FIG. 4. The request transmission power field includes an identifier indicating the transmission power of a first level or second level for a connection request frame, or information about a power value.

The operation of a responder according to the fourth embodiment will be described with reference to flowcharts shown in FIGS. 20A and 20B. FIGS. 20A and 20B are flowcharts illustrating an example of processes by the responder from standby for a connection request frame up to transmission of a connection accept frame, which are obtained by modifying the flowcharts shown in FIGS. 13A and 13B. A description of steps of performing the same processes as those shown in the flowcharts of FIGS. 13A and 13B will be omitted. The block diagram of the responder is the same as that shown in FIG. 2.

In step S2001, a level determination unit 205 stores a reception power level measured by a level measurement unit 204 in step S707.

If the ACK policy of the connection request frame is ImACK, it is determined in step S2002 whether or not the measured and stored reception power level falls within the target level range. If the reception power level falls within the target level range, the process proceeds to step S2004; otherwise, the process proceeds to step S2003. If the target level is defined as one value, as shown in (a) of FIG. 8, whether the reception power level falls within the target level range is determined by determining whether the difference between the reception power level and the target level falls within a predetermined range. On the other hand, if the target level is defined as the range from an upper limit to a lower limit, as shown in (b) of FIG. 8, it is determined whether the reception power level falls within the range.

In step S2004, a value indicating the transmission power of the first level is set in the request transmission power field 1901 of an ACK frame.

In step S2003, a value indicating the transmission power of the second level is set in the request transmission power field 1901 of an ACK frame. Processing in step S707 and the subsequent steps is the same as that shown in FIGS. 13A and 13B, and a description thereof will be omitted.

Figure 21:
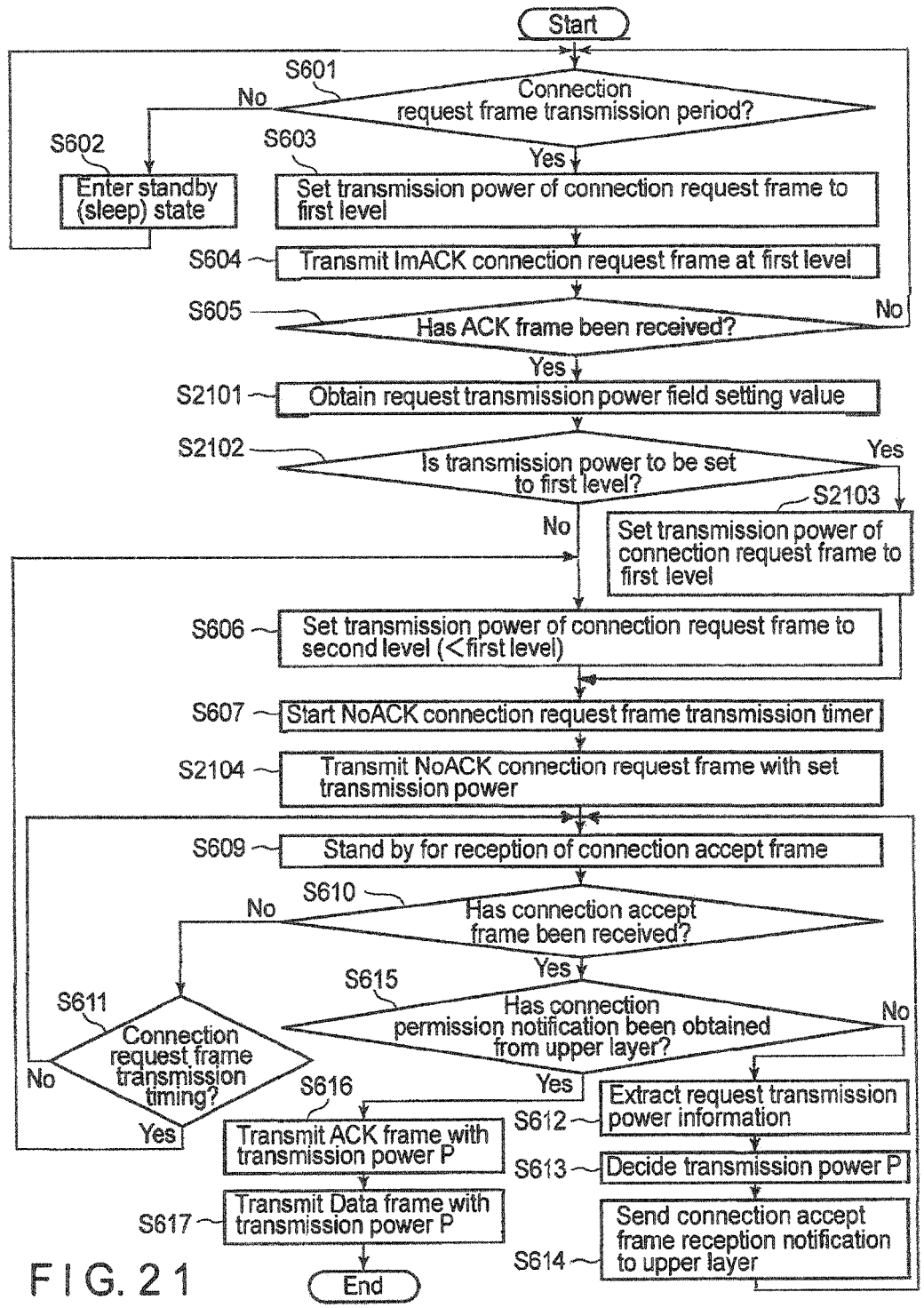
FIG. 21 is a flowchart illustrating the operation of an initiator according to the fourth embodiment.

The operation of an initiator according to the fourth embodiment will be described with reference to a flowchart shown in FIG. 21. FIG. 21 is a flowchart illustrating processes by the initiator from transmission of a connection request frame up to transmission of a data frame, which is obtained by modifying the flowchart shown in FIG. 6. A description of steps of performing the same processes as those shown in the flowchart of FIG. 6 will be omitted. The block diagram of the initiator is the same as that shown in FIG. 2.

In step S2101, if it is determined in step S605 that an ACK frame has been received, a reception frame analysis unit 208 obtains a value which is set in the request transmission power field 1901 of the ACK frame.

In step S2102, the reception frame analysis unit 208 determines whether the value set in the request transmission power field 1901 indicates the first level or second level. If the setting value indicates the first level, the process proceeds to step S2103. If the setting value indicates the second level, the process proceeds to step S606.

In step S2103, a control unit 209 sets, to the first level, the transmission power of a connection request frame with an ACK policy of NoACK.

After the start of a transmission timer for a connection request frame with an ACK policy of NoACK in step S607, in step S2104 a connection request frame with an ACK policy of NoACK is transmitted with the transmission power determined in step S606 or S2103. Subsequent processing is the same as that shown in FIG. 6, and a description thereof will be omitted. The operation of the initiator according to the fourth embodiment is then terminated.

Figure 22:
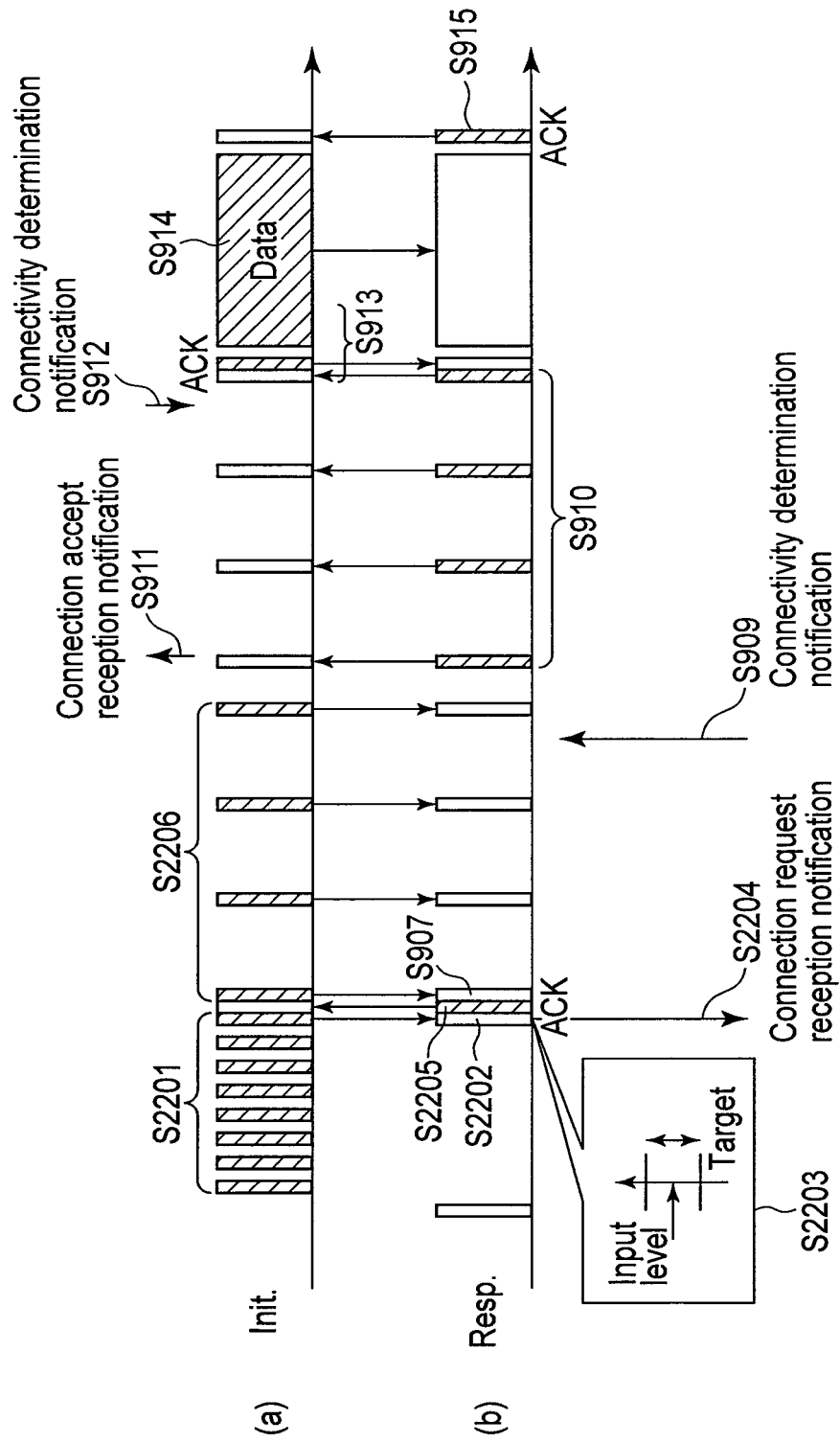
FIG. 22 is a timing chart illustrating an example of data frame exchange between wireless communication apparatuses according to the fourth embodiment.

The operation between wireless communication apparatuses according to the fourth embodiment will be described with reference to FIG. 22. FIG. 22 is a timing chart showing processes from establishment of connection between an initiator and a responder up to data frame exchange.

(a) of FIG. 22 shows transmission/reception processing executed by the initiator. (b) of FIG. 22 shows transmission/reception processing executed by the responder.

In step S2201, the initiator repeatedly transmits a connection request frame with an ACK policy of ImACK with the transmission power of the first level at a first time interval during a connection request frame transmission period.

In step S2202, the responder receives the connection request frame transmitted by the initiator.

In step S2203, the responder measures a reception power level, and determines whether or not the reception power level falls within the predetermined target level range. In this example, it is determined that the measured reception power level falls within the predetermined target level range.

In step S2204, the responder sends a connection request reception notification to the upper layer.

In step S2205, the responder sets the first level corresponding to the transmission power of the received connection request frame in the request transmission power field 1901 of an ACK frame, and transmits the ACK frame with the transmission power of the first level to the initiator.

In step S2206, the initiator receives the ACK frame from the responder, and obtains the setting value of the request transmission power field 1901, thereby identifying that the first level has been set in the request transmission power field 1901. The initiator, therefore, repeatedly transmits a connection request frame with an ACK policy of NoACK with the transmission power of the first level at a predetermined transmission time interval. Subsequent processing is the same as that between the wireless communication apparatuses according to the first embodiment shown in FIG. 9, and a description thereof will be omitted. The operation between the wireless communication apparatuses according to the fourth embodiment is then terminated.

According to the fourth embodiment described above, an apparatus can receive a frame with a transmission power suitable for itself by feeding back, to the transmission side, information about transmission power such that a reception signal level falls within the target level range. This enables the reception power level in the apparatus to be set to an appropriate value, thereby improving the reception characteristics.

Fifth Embodiment

The fifth embodiment is different from the above-described embodiments in that if both transmission powers of a first level and second level fall within a target level range, a smaller transmission power is selected. This can reduce the power consumption of an initiator which transmits a connection request frame.

Figure 23B:
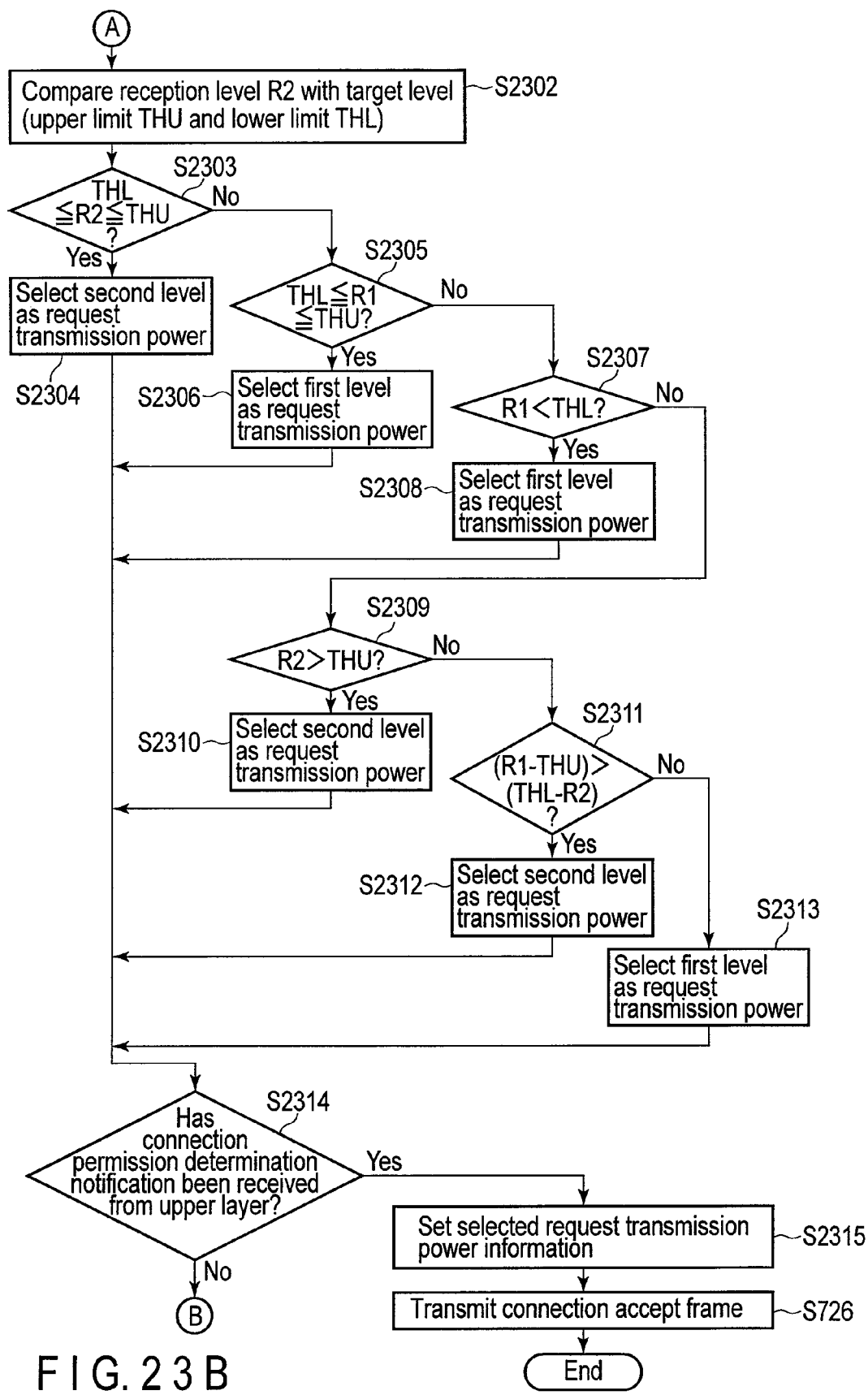
FIG. 23B is a flowchart illustrating the operation of the responder according to the fifth embodiment.

The operation of a responder according to the fifth embodiment will be described with reference to flowcharts shown in FIGS. 23A and 23B. FIGS. 23A and 23B show processes by the responder from standby for a connection request frame up to transmission of a connection accept frame. The flowcharts of FIGS. 23A and 23B are obtained by modifying the flowcharts of FIGS. 20A and 20B. A description of steps of performing the same processes as those in the flowcharts of FIGS. 20A and 20B will be omitted. The block diagram of the responder is the same as that shown in FIG. 2.

In step S2301, if it is determined in step S718 that the ACK policy of a connection request frame is ImACK, a level determination unit 205 compares a stored reception power level (R1) with an upper limit THU and a lower limit THL of the target level range.

In step S2302, if it is determined in step S718 that the ACK policy of the connection request frame is NoACK, the level determination unit 205 compares a stored reception power level R2 with the upper limit THU and lower limit THL of the target level range.

In step S2303, the level determination unit 205 determines whether or not the reception power level (R2) of the connection request frame with an ACK policy of NoACK falls within the target level range, that is, $THL \leq R2 \leq THU$. If $THL \leq R2 \leq THU$, the process proceeds to step S2304; otherwise, the process proceeds to step S2305.

In step S2304, a frame generation unit 212 selects the second level as a request transmission power.

In step S2305, the level determination unit 205 determines whether or not the reception power level R1 falls within the target level range, that is, $THL \leq R1 \leq THU$. If $THL \leq R1 \leq THU$, the process proceeds to step S2306; otherwise, the process proceeds to step S2307.

In step S2306, the frame generation unit 212 selects the first level as a request transmission power.

In step S2307, the level determination unit 205 determines whether or not the reception power level R1 is smaller than the lower limit THL, that is, $R1<THL$. If $R1<THL$, the process proceeds to step S2308; otherwise, the process proceeds to step S2309.

In step S2308, the frame generation unit 212 selects the first level as a request transmission power.

In step S2309, the level determination unit 205 determines whether or not the reception power level R2 is larger than the upper limit THU, that is, $R2>THU$. If $R2>THU$, the process proceeds to step S2310; otherwise, the process proceeds to step S2311.

In step S2310, the frame generation unit 212 selects the second level as a request transmission power.

In step S2311, the level determination unit 205 determines whether or not the difference between the reception power level R1 and the upper limit THU is larger than the difference between the lower limit THL and the reception power level R2, that is, $(R1-THU)>(THL-R2)$. If $(R1-THU)>(THL-R2)$, the process proceeds to step S2312; otherwise, the process proceeds to step S2313.

In step S2312, the frame generation unit 212 selects the second level as a request transmission power.

In step S2313, the frame generation unit 212 selects the first level as a request transmission power.

In step S2314, a connection state management unit 210 determines whether or not a connection permission determination notification has been received from the upper layer. If a connection permission determination notification has been received, the process proceeds to step S2315; otherwise, the process proceeds to step S713.

In step S2315, the frame generation unit 212 sets the selected request transmission power in the request transmission power field 1901 of a connection accept frame, and transmits the connection accept frame in step S726. The processing of the responder according to the fifth embodiment is then terminated.

Figure 24:
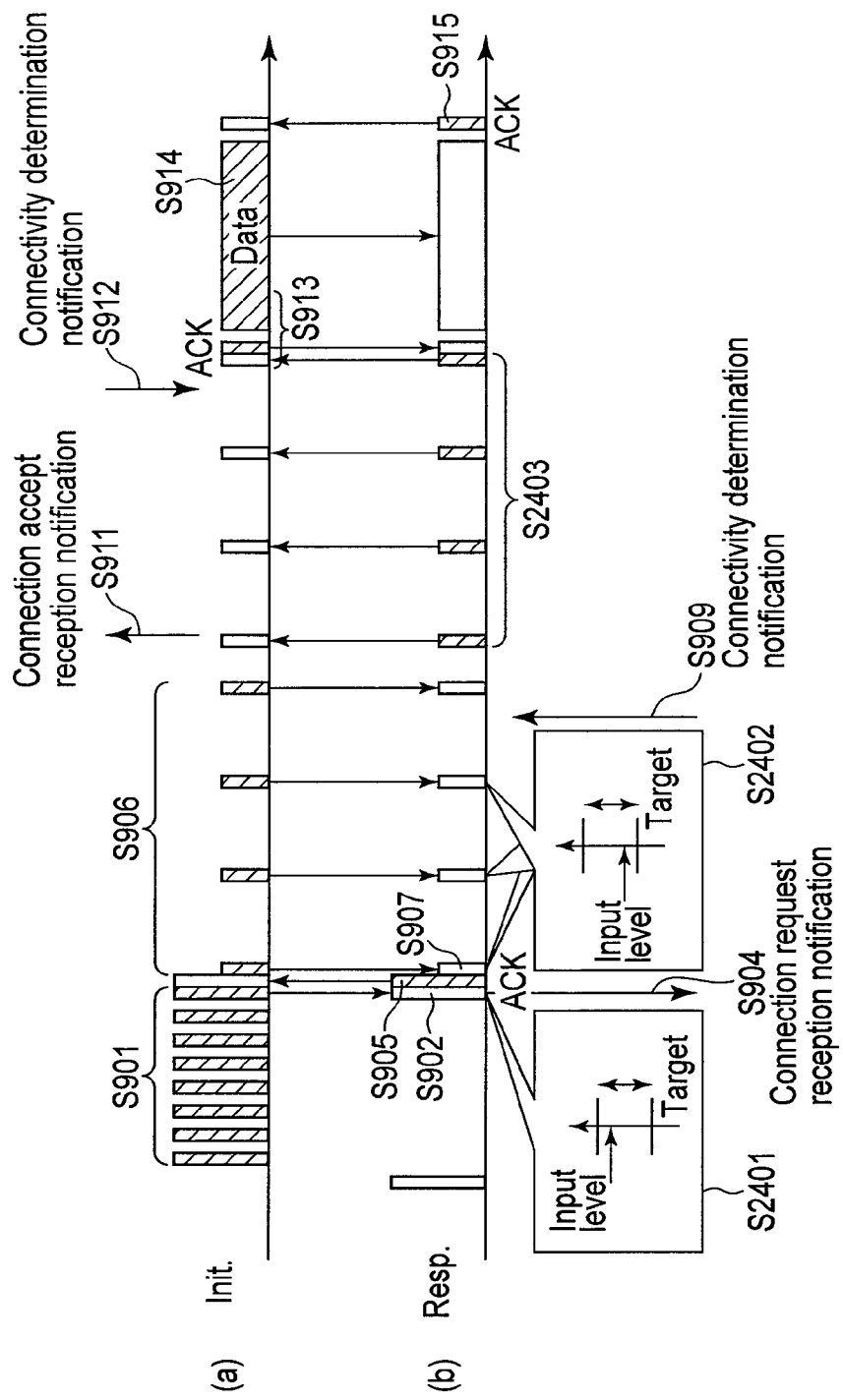
FIG. 24 is a timing chart illustrating an example of data frame exchange between wireless communication apparatuses according to the fifth embodiment.

The operation between wireless communication apparatuses according to the fifth embodiment will be described with reference to FIG. 24. FIG. 24 is a timing chart showing processes from establishment of connection between an initiator and a responder up to data frame exchange. (a) of FIG. 24 shows transmission/reception processing executed by the initiator. (b) of FIG. 24 shows transmission/reception processing executed by the responder.

In step S2401, the responder measures the reception power level R1 of a connection request frame with an ACK policy of ImACK, and compares the reception power level R1 with the target level range. In this example, it is determined that the reception power level R1 falls within the target level range.

In step S2402, the responder measures the reception power level R2 of a connection request frame with an ACK policy of NoACK, and compares the reception power level R2 with the target level range. In this example, it is determined that the reception power level R2 falls within the target level range.

In step S2403, the responder sets the transmission power of the second level lower than the first level as a request transmission power in a connection accept frame, and transmits the connection accept frame. Subsequent processing is the same as that shown in FIG. 9, and a description thereof will be omitted.

According to the fifth embodiment described above, if the reception power level of an ImACK connection request frame transmitted at the first level, the transmission power of which is large, and the reception power level of a NoACK connection request frame transmitted at the second level, the transmission power of which is small, fall within the target level range, the smaller transmission power is selected, thereby enabling to reduce the power consumption on the initiator side.

Sixth Embodiment

The sixth embodiment is different from the above-described embodiments in that if the transmission powers of both a first level and second level fall outside a target level range, a third level between the first level and the second level is selected as a transmission power. This enables to select a transmission power which falls within the target level range, and to set a reception signal level in the apparatus to an appropriate value, thereby improving the reception characteristics.

Figure 25:
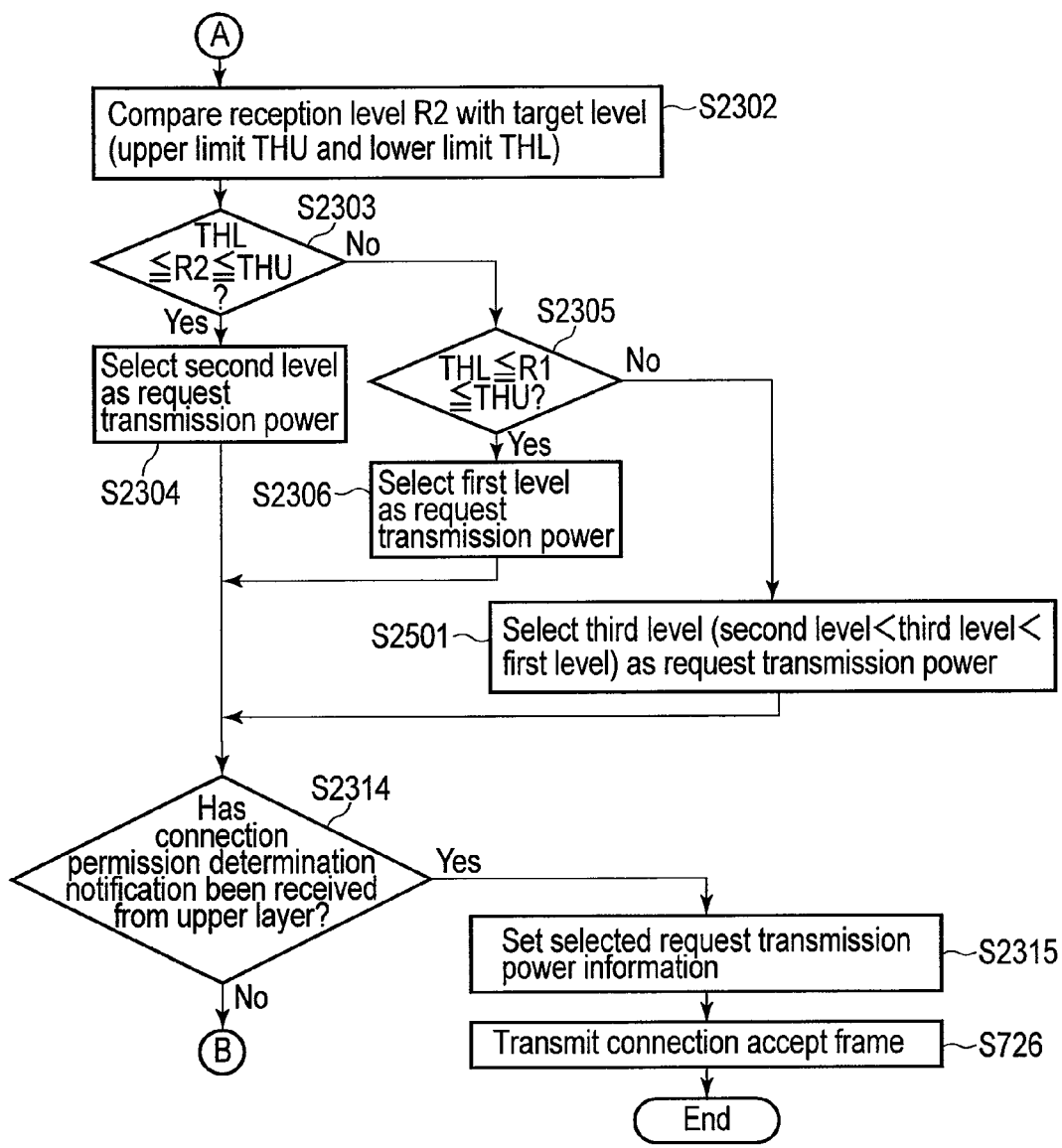
FIG. 25 is a flowchart illustrating the operation of a responder according to the sixth embodiment.

The operation of a responder according to the sixth embodiment will be described with reference to a flowchart shown in FIG. 25. The flowchart shown in FIG. 25 is obtained by modifying the flowchart shown in FIG. 23B. The operation of the responder according to the sixth embodiment is almost the same as that shown in FIGS. 23A and 23B, and a description thereof will be omitted. The block diagram of the responder is the same as that shown in FIG. 2.

In step S2501, if it is determined in step S2305 that the transmission power of the first level falls outside the target level range, the third level is selected as a request transmission power. The third level is a transmission power between the first level and the second level.

According to the sixth embodiment described above, it is possible to select a transmission power which falls within the target level range, and to set the reception signal level in the apparatus to an appropriate value, thereby improving the reception characteristics.

Seventh Embodiment

The seventh embodiment is different from the above-described embodiments in that a request transmission power is determined not based on an ImACK connection request frame but based on a NoACK connection request frame. While transmitting/receiving an ImACK connection request frame, the distance between wireless communication apparatuses may not be constant yet and may be changing. If the distance is changing, it is not desirable to determine a request transmission power using the reception power of the received ImACK connection request frame. It is, therefore, possible to set a reception signal level to an appropriate value by determining a request transmission power based on the reception power with which a NoACK connection request frame is received when the distance between the wireless communication apparatuses is expected to be constant after a given period of time elapses, thereby improving the reception characteristics.

Figure 26:
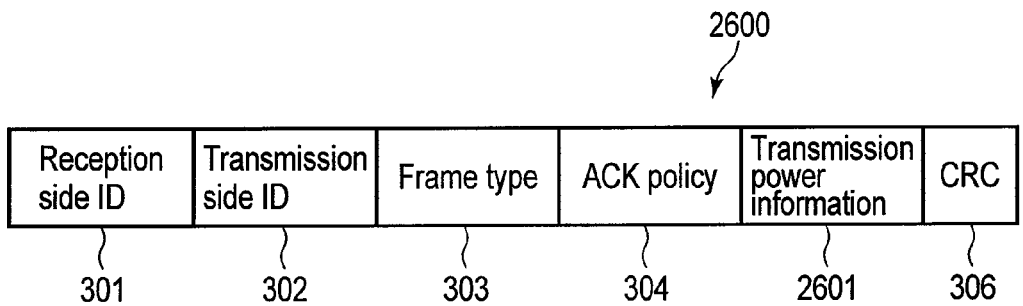
FIG. 26 is a view illustrating the connection request frame format according to the seventh embodiment.

FIG. 26 shows an example of the frame format of a connection request frame transmitted by an initiator according to the seventh embodiment.

A frame format 2600 shown in FIG. 26 is obtained by adding a transmission power information field 2601 to a connection request frame 300 shown in FIG. 3. An identifier indicating the transmission power of a first level or second level is set in the transmission power information field 2601.

Figure 27A:
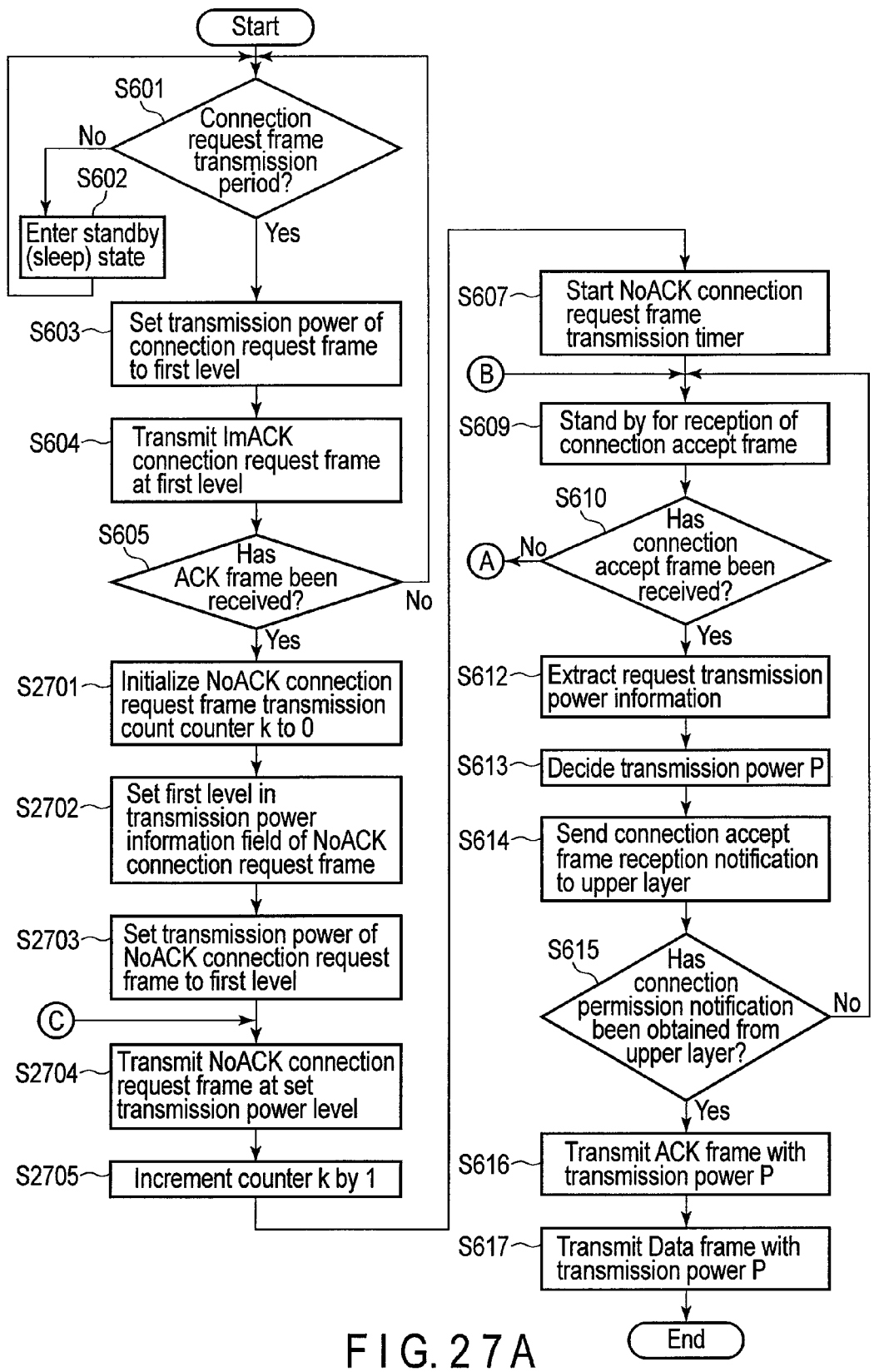
FIG. 27A is a flowchart illustrating the operation of an initiator according to the seventh embodiment.
Figure 27B:
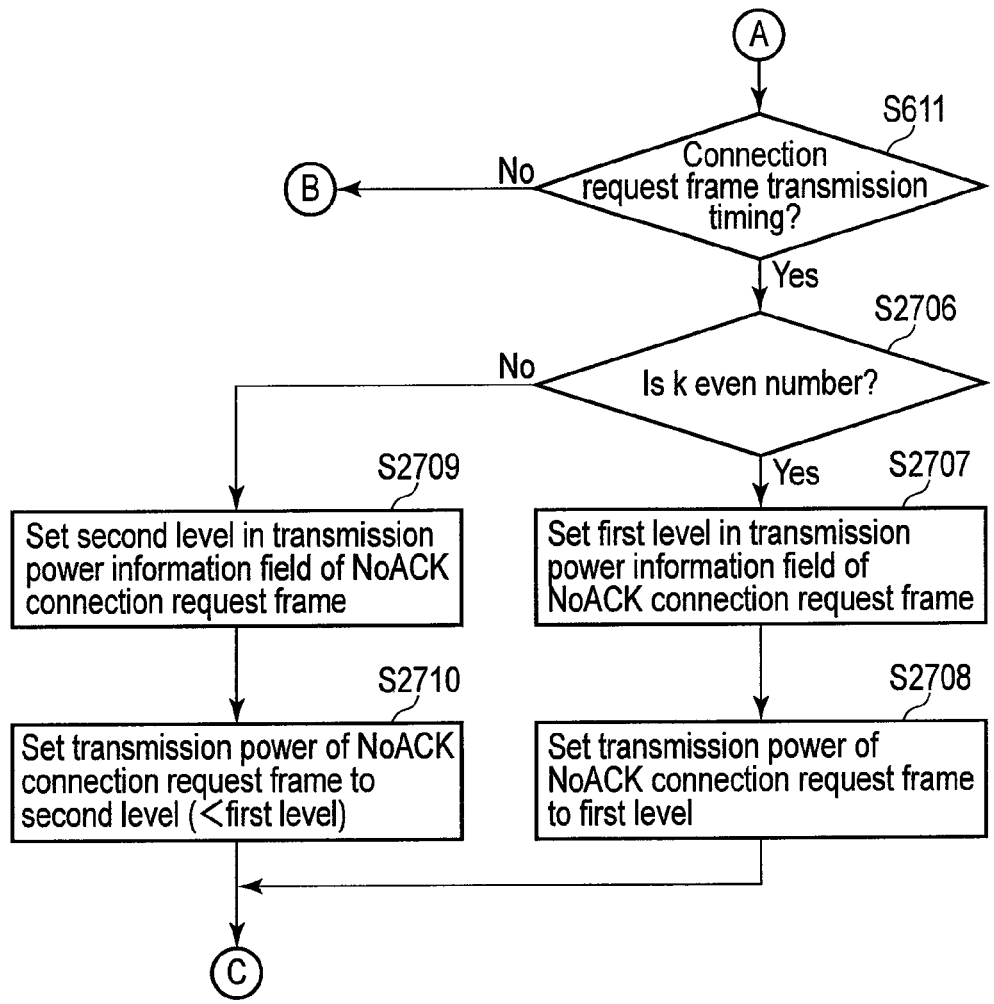
FIG. 27B is a flowchart illustrating the operation of the initiator according to the seventh embodiment.

The operation of the initiator according to the seventh embodiment will be described with reference to flowcharts shown in FIGS. 27A and 27B. The flowcharts shown in FIGS. 27A and 27B are obtained by modifying the flowchart shown in FIG. 6. A description of steps of performing the same processes as those in the flowchart of FIG. 6 will be omitted. The block diagram of the initiator is the same as that shown in FIG. 10.

In step S2701, if it is determined in step S605 that an ACK frame has been received, a counter 1002 initializes a NoACK connection request frame transmission count counter k to 0 (zero).

In step S2702, a frame generation unit 212 sets a value indicating the transmission power of the first level in the transmission power information field 2601 of a NoACK connection request frame.

In step S2703, a control unit 209 sets the transmission power of the NoACK connection request frame to the first level.

In step S2704, a transmission unit 213 transmits the NoACK connection request frame with the set transmission power of the first level to a responder.

In step S2705, the counter 1002 increments the NoACK connection request frame transmission count counter k by one.

In step S2706, if it is determined in step S611 that it is a connection request frame transmission timing, the control unit 209 determines whether or not the NoACK connection request frame transmission count counter k indicates an even number. If the transmission count counter k indicates an even number, the process proceeds to step S2707; otherwise, the process proceeds to step S2709.

In step S2707, the frame generation unit 212 sets a value indicating the transmission power of the first level in the transmission power information field 2601 of the NoACK connection request frame.

In step S2708, the control unit 209 sets the transmission power of the NoACK connection request frame to the first level.

In step S2709, the frame generation unit 212 sets a value indicating the transmission power of the second level in the transmission power information field 2601 of the NoACK connection request frame.

In step S2710, the control unit 209 sets the transmission power of the NoACK connection request frame to the second level. After the processing in step S2708 or S2710, the process returns to step S2704 to transmit the NoACK connection request frame at the set transmission power level. The operation of the initiator according to the seventh embodiment is then terminated.

Figure 28A:
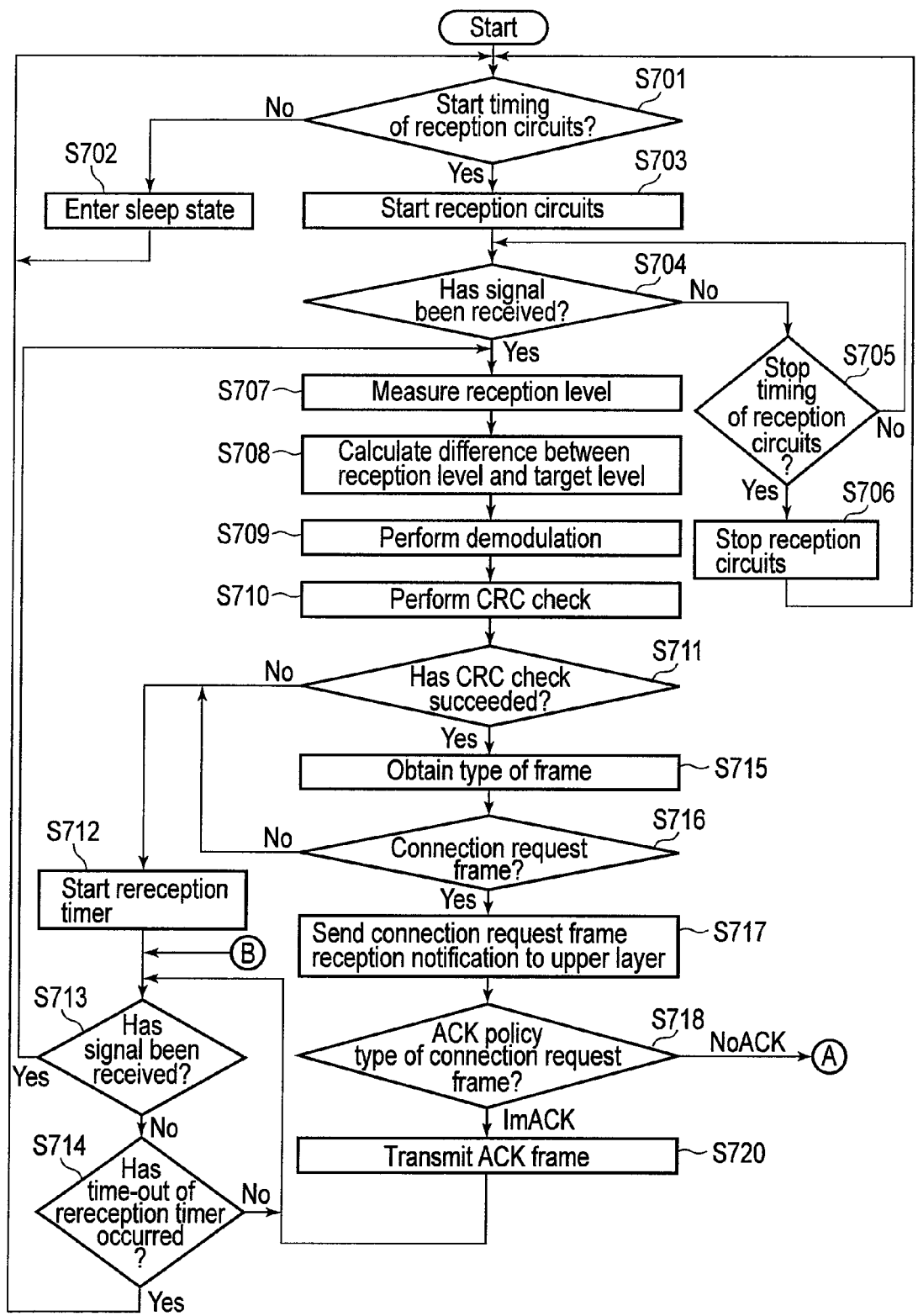
FIG. 28A is a flowchart illustrating the operation of a responder according to the seventh embodiment.
Figure 28B:
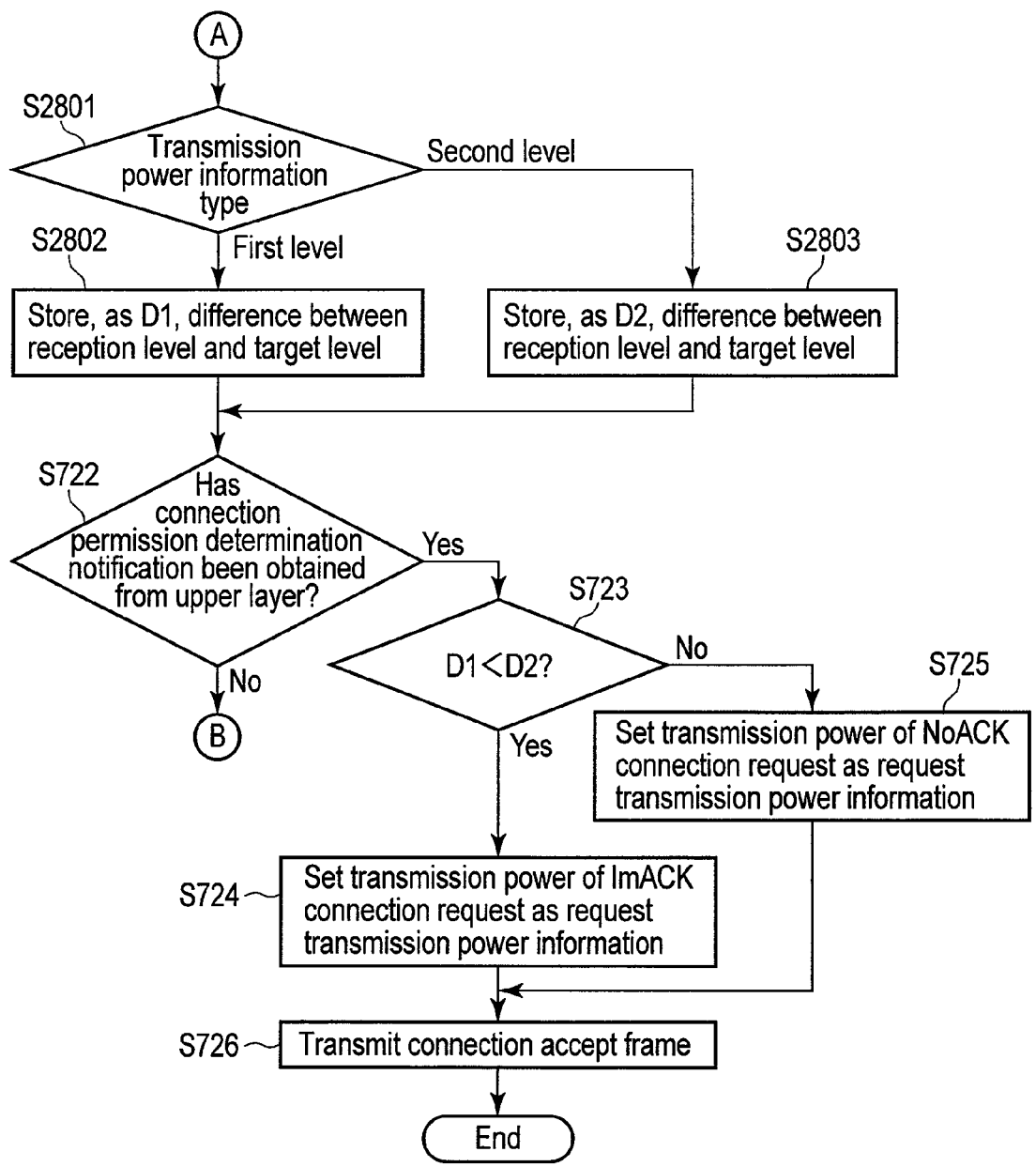
FIG. 28B is a flowchart illustrating the operation of the responder according to the seventh embodiment.

The operation of the responder according to the seventh embodiment will be described with reference to FIGS. 28A and 28B. Flowcharts shown in FIGS. 28A and 28B are obtained by modifying the flowcharts shown in FIGS. 7A and 7B. A description of steps of performing the same processes as those in FIGS. 7A and 7B will be omitted.

In step S2801, if it is determined in step S718 that the ACK policy type of the connection request frame is NoACK, a reception frame analysis unit 208 obtains the transmission power information set in the transmission power information field 2601, and determines the transmission power information. If the set transmission power information indicates the first level, the process proceeds to step S2802. Alternatively, if the set transmission power information indicates the second level, the process proceeds to step S2803.

In step S2802, a level determination unit 205 stores, as a difference D1, the difference between a reception power and a target level.

In step S2803, the level determination unit 205 stores, as a difference D2, the difference between a reception power and the target level. After the processing in step S2802 or S2803, the process proceeds to step S722. Processing in step S722 and the subsequent steps is the same as that shown in FIGS. 7A and 7B. The operation of the responder according to the seventh embodiment is then terminated.

The operation between wireless communication apparatuses according to the seventh embodiment will be described with reference to FIG. 29. FIG. 29 is a timing chart showing processes from establishment of connection between an initiator and a responder up to data frame exchange. (a) of FIG. 29 shows transmission/reception processing executed by the initiator. (b) of FIG. 29 shows transmission/reception processing executed by the responder.

In step S2901, the initiator transmits a NoACK connection request frame. In the example shown in FIG. 29, a setting is made so that the transmission power of the first level and that of the second level are alternately transmitted according to the operation of the initiator shown in FIGS. 27A and 27B.

In step S2902, the responder receives a NoACK connection request frame (a connection request frame 2910 or 2911 in FIG. 29) whose transmission power information field 2601 has been set with the first level, and calculates the difference D1 between a reception power level and the median value of the target level range. In this example, since the reception power level falls outside the target level range, the difference D1 is determined to be ∞.

On the other hand, the responder receives a NoACK connection request frame (a connection request frame 2912 or 2913 in FIG. 29) whose transmission power information field 2601 has been set with the second level, and calculates the difference D2 between a reception power level and the median value of the target level range. In this example, assume that the reception power level falls within the target level range.

In step S2903, the responder compares the differences D1 and D2 with each other, and determines that the difference D2 falls within the target level range, that is, the difference D1 is larger than the difference D2. The responder, therefore, sets the second level as a transmission power corresponding to the difference D2 in a request transmission power field 505 of a connection accept frame, and transmits the connection accept frame.

According to the seventh embodiment described above, a NoACK connection request frame is transmitted with two transmission powers including the transmission power of the first level and that of the second level, feedback on information about one of the transmission powers is received from the initiator, and then a request transmission power is determined based on a reception power with which the NoACK connection request frame is received when the distance between the wireless communication apparatuses is expected to be constant, thereby enabling to set a reception signal level to an appropriate value. This results in improvement in reception characteristics.

Eighth Embodiment

The eighth embodiment is different from the above-described embodiments in that appropriate transmission power information which prevents a reception error from occurring in a responder is fed back to an initiator. This allows the responder to receive a frame transmitted with a transmission power suitable for the responder.

The operation of a responder according to the eighth embodiment will be described with reference to flowcharts shown in FIGS. 30A and 30B.

The flowcharts shown in FIGS. 30A and 30B are obtained by modifying the flowcharts shown in FIGS. 28A and 28B. A description of steps of performing the same processes as those in the flowcharts shown in FIGS. 28A and 28B will be omitted. The block diagram of the responder is the same as that shown in FIG. 10.

In step S3001, after transmitting an ImACK connection request frame in step S720, a counter 1002 initializes, to zero, a counter C1 for counting the number of times of reception of a NoACK connection request frame in which a first level has been set as transmission power information.

In step S3002, the counter 1002 initializes, zero, a counter C2 for counting the number of times of reception of a NoACK connection request frame in which a second level has been set as transmission power information, and the process proceeds to step S713.

In step S3003, the counter 1002 increments the counter C1 by one.

In step S3004, the counter 1002 increments the counter C2 by one.

If it is determined in step S722 that a connection permission determination notification has been received from the upper layer, a level determination unit 205 compares the counters C1 and C2 with each other in step S3005. If the counter C1 is larger than the counter C2, the process proceeds to step S3006. If the counter C1 is equal to the counter C2, the process proceeds to step S723. If the counter C1 is smaller than the counter C2, the process proceeds to step S3007.

In step S3006, to set the first level as request transmission power information, a frame generation unit 212 sets an identifier indicating the first level in a request transmission power field 505 of a connection accept frame 500.

In step S3007, to set the second level as request transmission power information, the frame generation unit 212 sets an identifier indicating the second level in the request transmission power field 505 of the connection accept frame 500.

On the other hand, if it is determined in step S723 that D1 is smaller than D2, the process proceeds to step S3006 to execute the above-described processing. If D1 is not less than D2, the process proceeds to step S3007 to execute the above-described processing. The processing by the responder according to the eighth embodiment is then terminated.

The operation between wireless communication apparatuses according to the eighth embodiment will be described with reference to FIG. 31.

FIG. 31 is a timing chart showing processes from establishment of connection between an initiator and a responder up to data frame exchange. (a) of FIG. 31 shows transmission/reception processing executed by the initiator. (b) of FIG. 31 shows transmission/reception processing executed by the responder.

In step S3101, the responder tries to receive a NoACK connection request frame (2910 and 2911) in which the first level has been set in a transmission power information field 2601. In this example, an error occurs in reception of the NoACK connection request frame transmitted at the first level, and no NoACK connection request frame has been successively received, thereby setting the counter C1 to "0 (zero)".

On the other hand, before a connectivity determination notification indicated in step S909 is received from the upper layer, the responder tries to receive a NoACK connection request frame (2912 and 2913) in which the second level has been set in the transmission power information field 2601 and which has been transmitted with the transmission power of the second level. In this example, assume that the NoACK connection request frame has been successively received twice. The counter C2 is, therefore, set to "2".

Since the counter C1 is smaller than the counter C2, in step S3102 the responder sets the second level as a transmission power corresponding to the counter C2 in a connection accept frame, and transmits the connection accept frame. Subsequent processing is the same as that shown in FIG. 29, and a description thereof will be omitted.

According to the eighth embodiment described above, the responder can receive a frame transmitted with a transmission power suitable for the responder by feeding back, to the initiator, appropriate transmission power information which prevents a reception error. This enables to set the reception power level in the responder to an appropriate value, resulting in improvement in reception characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a generation unit configured to generate a first request frame and a second request frame, the first request frame being a frame for requesting a connection with another communication apparatus and requiring an acknowledgement from the other communication apparatus, the second request frame being a frame for requesting the connection with the other communication apparatus and not requiring the acknowledgement from the other communication apparatus;
a control unit configured to set, as a first value, a magnitude of a transmission power of the first request frame, and set, as a second value smaller than the first value, a magnitude of a transmission power of the second request frame;
a transmission unit configured to transmit the first request frame at a first time interval until an acknowledgement frame is received, and transmit the second request frame at a second time interval until an accept frame is received, the acknowledgement frame being a frame for responding to the first request frame, the accept frame being a frame for responding to the second request frame and including a request transmission power information which indicates information about a transmission power requested by the other communication apparatus, the second time interval being longer than the first time interval;
a reception unit configured to receive the acknowledgement frame and the accept frame; and
an analysis unit configured to analyze the request transmission power information,
wherein:
the control unit determines a transmission power of a data frame based on the request transmission power information, and
the analysis unit extracts a frame type information specifying a type of frame included in the acknowledgement frame, and the generation unit transmits the first request frame if the frame type information indicates the first request frame.

2. A wireless communication apparatus comprising:
a generation unit configured to generate a first request frame and a second request frame, the first request frame being a frame for requesting a connection with another communication apparatus and requiring an acknowledgement from the other communication apparatus, the second request frame being a frame for requesting the connection with the other communication apparatus and not requiring the acknowledgement from the other communication apparatus;
a control unit configured to set, as a first value, a magnitude of a transmission power of the first request frame, and set, as a second value smaller than the first value, a magnitude of a transmission power of the second request frame;
a transmission unit configured to transmit the first request frame at a first time interval until an acknowledgement frame is received, and transmit the second request frame at a second time interval until an accept frame is received, the acknowledgement frame being a frame for responding to the first request frame, the accept frame being a frame for responding to the second request frame and including a request transmission power information which indicates information about a transmission power requested by the other communication apparatus, the second time interval being longer than the first time interval;
a reception unit configured to receive the acknowledgement frame and the accept frame; and
an analysis unit configured to analyze the request transmission power information,
wherein:
the generation unit alternately inserts, in a plurality of second request frames, a first identifier indicating a transmission power corresponding to the first value and a second identifier indicating a transmission power corresponding to the second value, according to a transmission order of the second request frames, and
the control unit sets to transmit, with the transmission power corresponding to the first value, the second request frame in which the first identifier is inserted, and sets to transmit, with the transmission power corresponding to the second value, the second request frame in which the second identifier is inserted.

3. A wireless communication apparatus comprising:
a reception unit configured to receive a first request frame and a second request frame, the first request frame indicating a connection request from another communication apparatus and requiring an acknowledgement, the second request frame indicating the connection request from the other communication apparatus and not requiring the acknowledgement;
a management unit configured to notify an upper layer of a first notification indicating that the first request frame is received, and obtain, from the upper layer, a second notification indicating whether or not to connect to the other communication apparatus;
a measurement unit configured to measure a first value indicating a reception power value when the first request frame is received, and a second value indicating a reception power value when the second request frame is received;
a determination unit configured to determine, before the second notification is obtained, which of a first difference value and a second difference value is smaller, the first difference value being a difference value between the first value and a target value which indicates a target reception power value, the second difference value being a difference value between the second value and the target value;
a control unit configured to set, as a request transmission power, a transmission power value corresponding to the first value when the first difference value is smaller than the second difference value, and configured to set, as the request transmission power, a transmission power value corresponding to the second value when the second difference value is smaller than the first difference value;
a generation unit configured to generate an accept frame including information indicating the request transmission power;
a transmission unit configured to transmit the accept frame to the other communication apparatus; and
a counter configured to count a number of times of reception of the first request frame,
wherein if the number of times of reception of the first request frame is not more than a predetermined threshold, the generation unit generates an acknowledgement frame including information for requesting the first request frame as frame type information for specifying a type of frame, and
wherein the determination unit determines, as the first difference value, a difference value between the target value and an average of the first values.

4. A wireless communication apparatus comprising:
a reception unit configured to receive a first request frame and a second request frame, the first request frame indicating a connection request from another communication apparatus and requiring an acknowledgement, the second request frame indicating the connection request from the other communication apparatus and not requiring the acknowledgement;
a management unit configured to notify an upper layer of a first notification indicating that the first request frame is received, and obtain, from the upper layer, a second notification indicating whether or not to connect to the other communication apparatus;
a measurement unit configured to measure a first value indicating a reception power value when the first request frame is received, and a second value indicating a reception power value when the second request frame is received;
a determination unit configured to determine, before the second notification is obtained, which of a first difference value and a second difference value is smaller, the first difference value being a difference value between the first value and a target value which indicates a target reception power value, the second difference value being a difference value between the second value and the target value;
a control unit configured to set, as a request transmission power, a transmission power value corresponding to the first value when the first difference value is smaller than the second difference value, and configured to set, as the request transmission power, a transmission power value corresponding to the second value when the second difference value is smaller than the first difference value;
a generation unit configured to generate an accept frame including information indicating the request transmission power; and
a transmission unit configured to transmit the accept frame to the other communication apparatus,
wherein:
if the target value is defined as a range of a power value from an upper limit to a lower limit, the determination unit determines whether or not the first value falls within the range of the target value, and
the generation unit generates, if the first value falls within the range of the target value, an acknowledgement frame including information for requesting transmission with a transmission power corresponding to the first value, and generates, if the first value falls outside the range of the target value, an acknowledgement frame including information for requesting transmission with a transmission power corresponding to the second value.

5. A wireless communication apparatus comprising:
a reception unit configured to receive a first request frame and a second request frame, the first request frame indicating a connection request from another communication apparatus and requiring an acknowledgement, the second request frame indicating the connection request from the other communication apparatus and not requiring the acknowledgement;
a management unit configured to notify an upper layer of a first notification indicating that the first request frame is received, and obtain, from the upper layer, a second notification indicating whether or not to connect to the other communication apparatus;
a measurement unit configured to measure a first value indicating a reception power value when the first request frame is received, and a second value indicating a reception power value when the second request frame is received;
a determination unit configured to determine, before the second notification is obtained, which of a first difference value and a second difference value is smaller, the first difference value being a difference value between the first value and a target value which indicates a target reception power value, the second difference value being a difference value between the second value and the target value;
a control unit configured to set, as a request transmission power, a transmission power value corresponding to the first value when the first difference value is smaller than the second difference value, and configured to set, as the request transmission power, a transmission power value corresponding to the second value when the second difference value is smaller than the first difference value;
a generation unit configured to generate an accept frame including information indicating the request transmission power; and
a transmission unit configured to transmit the accept frame to the other communication apparatus,
wherein:

if the target value is defined as a range of a power value from an upper limit to a lower limit, the determination unit determines whether or not the first value and the second value fall within the range of the target value, and if both the first value and the second value fall within the range of the target value, the generation unit generates the accept frame including information for requesting transmission with a transmission power corresponding to a smaller one of the first value and the second value.

6. A wireless communication apparatus comprising:

a reception unit configured to receive a first request frame and a second request frame, the first request frame indicating a connection request from another communication apparatus and requiring an acknowledgement, the second request frame indicating the connection request from the other communication apparatus and not requiring the acknowledgement;

a management unit configured to notify an upper layer of a first notification indicating that the first request frame is received, and obtain, from the upper layer, a second notification indicating whether or not to connect to the other communication apparatus;

a measurement unit configured to measure a first value indicating a reception power value when the first request frame is received, and a second value indicating a reception power value when the second request frame is received;

a determination unit configured to determine, before the second notification is obtained, which of a first difference value and a second difference value is smaller, the first difference value being a difference value between the first value and a target value which indicates a target reception power value, the second difference value being a difference value between the second value and the target value;

a control unit configured to set, as a request transmission power, a transmission power value corresponding to the first value when the first difference value is smaller than the second difference value, and configured to set, as the request transmission power, a transmission power value corresponding to the second value when the second difference value is smaller than the first difference value;

a generation unit configured to generate an accept frame including information indicating the request transmission power;

a transmission unit configured to transmit the accept frame to the other communication apparatus; and an analysis unit configured to, if burst transmission in which a set of a plurality of first request frames is repeatedly transmitted is performed, extract a count value from the first request frame, the count value indicating a remaining number of first request frames up to a first request frame to be transmitted last within the set, wherein:

if a number of times of reception of the first request frame reaches a predetermined threshold or the count value is zero, the transmission unit transmits an acknowledgement frame indicating an acknowledgement to the first request frame, the determination unit determines, as the first difference value, a difference value between the target value and an average of the first values, the analysis unit extracts an identifier inserted in a second request frame, the determination unit determines, between a first identifier indicating a transmission power corresponding to the first value and a second identifier indicating a transmission power corresponding to the second value, a request identifier indicating an identifier with a smaller difference from the target value, the generation unit generates the accept frame including information for requesting transmission with a transmission power corresponding to the request identifier, the apparatus further comprises a checking unit configured to determine, based on error detection codes included in the first request frame and the second request frame, whether or not a reception error has occurred, the analysis unit extracts a third identifier if it is determined that a reception error has occurred during a period, the third identifier being included in one of a plurality of second request frames received without error during the period and indicating a transmission power when transmitting the second request frame, the period being a period indicating that a plurality of second request frames are received, and the control unit sets the request transmission power based on the third identifier.

7. A wireless communication method for a wireless communication apparatus, the method comprising:

generating a first request frame and a second request frame, the first request frame being a frame for requesting a connection with another communication apparatus and requiring an acknowledgement from the other communication apparatus, the second request frame being a frame for requesting the connection with the other communication apparatus and not requiring the acknowledgement from the other communication apparatus;

setting, as a first value, a magnitude of a transmission power of the first request frame, and setting, as a second value smaller than the first value, a magnitude of a transmission power of the second request frame;

transmitting the first request frame at a first time interval until an acknowledgement frame is received, and transmitting the second request frame at a second time interval until an accept frame is received, the acknowledgement frame being a frame for responding to the first request frame, the accept frame being a frame for responding to the second request frame and including a request transmission power information which indicates information about a transmission power requested by the other communication apparatus, the second time interval being longer than the first time interval;

receiving the acknowledgement frame and the accept frame;

analyzing the request transmission power information; and determining a transmission power of a data frame based on the request transmission power information, wherein:

the generating the first request frame and the second request frame comprises alternately inserting, in a plurality of second request frames, a first identifier indicating a transmission power corresponding to the first value and a second identifier indicating a transmission power corresponding to the second value, according to a transmission order of the second request frames, and the setting the magnitude of the transmission power comprises setting to transmit, with the transmission power corresponding to the first value, the second request frame in which the first identifier is inserted, and setting to transmit, with the transmission power corresponding to the second value, the second request frame in which the second identifier is inserted.

* * * * *